United States Patent
Li

(10) Patent No.: US 8,317,331 B2
(45) Date of Patent: Nov. 27, 2012

(54) RECYCLING SYSTEM AND METHOD FOR INCREASING BRIGHTNESS USING LIGHT PIPES WITH ONE OR MORE LIGHT SOURCES, AND A PROJECTOR INCORPORATING THE SAME

(75) Inventor: Kenneth Li, Castaic, CA (US)

(73) Assignee: Wavien, Inc., Valencia, CA (US)

( * ) Notice: Subject to any disclaimer, the term of this patent is extended or adjusted under 35 U.S.C. 154(b) by 438 days.

(21) Appl. No.: 12/542,341

(22) Filed: Aug. 17, 2009

(65) Prior Publication Data
US 2010/0045937 A1 Feb. 25, 2010

Related U.S. Application Data

(63) Continuation-in-part of application No. 12/321,471, filed on Jan. 20, 2009, and a continuation-in-part of application No. 11/818,308, filed on Jun. 13, 2007, now Pat. No. 7,976,204.

(60) Provisional application No. 61/189,139, filed on Aug. 15, 2008, provisional application No. 61/204,421, filed on Jan. 7, 2009, provisional application No. 61/161,228, filed on Mar. 18, 2009, provisional application No. 61/168,249, filed on Apr. 10, 2009, provisional application No. 61/011,458, filed on Jan. 17, 2008, provisional application No. 61/130,981, filed on Jun. 5, 2008, provisional application No. 61/130,953, filed on Jun. 4, 2008, provisional application No. 61/137,895, filed on Aug. 4, 2008, provisional application No. 61/200,764, filed on Dec. 3, 2008, provisional application No. 61/203,503, filed on Dec. 23, 2008, provisional application No. 61/203,950, filed on Dec. 30, 2008, provisional application No. 61/130,002, filed on May 27, 2008, provisional application No. 61/130,336, filed on May 30, 2008, provisional application No. 60/813,186, filed on Jun. 13, 2006, provisional application No. 60/814,605, filed on Jun. 16, 2006, provisional application No. 60/830,946, filed on Jul. 13, 2006, provisional application No. 60/842,324, filed on Sep. 5, 2006, provisional application No. 60/848,429, filed on Sep. 28, 2006, provisional application No. 60/855,330, filed on Oct. 30, 2006.

(51) Int. Cl.
| | |
|---|---|
| G03B 21/26 | (2006.01) |
| G03B 21/28 | (2006.01) |
| F21V 9/00 | (2006.01) |
| G02B 6/10 | (2006.01) |
| G02B 5/08 | (2006.01) |
| G02B 7/182 | (2006.01) |
| G02B 27/10 | (2006.01) |

(52) U.S. Cl. ............... 353/31; 353/94; 353/98; 353/81; 362/511; 385/129; 385/146; 359/856; 359/619; 359/34

(58) Field of Classification Search .................... 353/31, 353/94, 122, 98, 81; 362/511; 385/129, 385/146; 359/856, 619, 34
See application file for complete search history.

(56) References Cited

U.S. PATENT DOCUMENTS
5,400,426 A 3/1995 de Jong et al.
(Continued)

*Primary Examiner* — Tony Ko
*Assistant Examiner* — Magda Cruz
(74) *Attorney, Agent, or Firm* — Abelman, Frayne & Schwab

(57) ABSTRACT

A recycling system and method for increasing the brightness of light output using at least one recycling light pipe with at least one light source. The output end of the recycling light pipe reflects a first portion of the light back to the light source, a second portion the light to the input end of the recycling light pipe, and transmits the remaining portion of the light as output. The recycling system is incorporated into a projector to provide color projected image with increased brightness. The light source can be white LEDs, color LEDs, and dual paraboloid reflector (DPR) lamp.

23 Claims, 21 Drawing Sheets

U.S. PATENT DOCUMENTS

| | | | |
|---|---|---|---|
| 7,052,150 B2* | 5/2006 | Dewald | 359/856 |
| 7,300,164 B2* | 11/2007 | Potekev | 353/122 |
| 7,475,992 B2* | 1/2009 | Abu-Ageel | 353/31 |
| 2005/0225866 A1 | 10/2005 | Abu-Ageel | |
| 2006/0008237 A1* | 1/2006 | Imade | 385/146 |
| 2006/0044523 A1* | 3/2006 | Teijido et al. | 353/53 |
| 2007/0284565 A1 | 12/2007 | Leatherdale et al. | |
| 2007/0291491 A1 | 12/2007 | Li et al. | |
| 2008/0030974 A1 | 2/2008 | Abu-Ageel | |

* cited by examiner

RECYCLING SYSTEM AND METHOD FOR INCREASING BRIGHTNESS USING LIGHT PIPES WITH ONE OR MORE LIGHT SOURCES, AND A PROJECTOR INCORPORATING THE SAME

CROSS-REFERENCE TO RELATED APPLICATIONS

This application claims the benefit of U.S. Provisional Application Ser. No. 61/189,139 filed Aug. 15, 2008, U.S. Provisional Application Ser. No. 61/204,421 filed Jan. 7, 2009, U.S. Provisional Application Ser. No. 61/161,228 filed Mar. 18, 2009, and U.S. Provisional Application Ser. No. 61/168,249 filed Apr. 10, 2009, each of which is incorporated by reference in its entirety.

This application is a continuation-in-part of U.S. application Ser. No. 12/321,471 filed Jan. 20, 2009, which claims the benefit of U.S. Provisional Application Ser. No. 61/011,458 filed Jan. 17, 2008, U.S. Provisional Application Ser. No. 61/130,981 filed Jun. 5, 2008, U.S. Provisional Application Ser. No. 61/130,953 filed Jun. 4, 2008, U.S. Provisional Application Ser. No. 61/137,895 filed Aug. 4, 2008, U.S. Provisional Application Ser. No. 61/200,764 filed Dec. 3, 2008, U.S. Provisional Application Ser. No. 61/203,503 filed Dec. 23, 2008, U.S. Provisional Application Ser. No. 61/203,950 filed Dec. 30, 2008, U.S. Provisional Application Ser. No. 61/130,002 filed May 27, 2008, and U.S. Provisional Application Ser. No. 61/130,336 filed May 30, 2008, each of which is incorporated herein by reference in its entirety.

This application is also a continuation-in-part application of Ser. No. 11/818,308 filed Jun. 13, 2007 now U.S. Pat. No. 7,976,204, which claims the benefit of U.S. Provisional Application Ser. No. 60/813,186 filed Jun. 13, 2006, U.S. Provisional Application Ser. No. 60/814,605 filed Jun. 16, 2006, U.S. Provisional Application Ser. No. 60/830,946 filed Jul. 13, 2006, U.S. Provisional Application Ser. No. 60/842,324 filed Sep. 5, 2006, U.S. Provisional Application Ser. No. 60/848,429 filed Sep. 28, 2006, and U.S. Provisional Application Ser. No. 60/855,330 filed Oct. 30, 2006, each of which is incorporated herein by reference in its entirety.

TECHNICAL FIELD OF INVENTION

This invention relates to systems and methods for providing higher brightness at the screen through efficient coupling of light from one or more light sources to the output, particularly increasing the brightness by recycling using light pipes with one or more light sources and incorporating the same in a projector.

BACKGROUND OF THE INVENTION

Light sources are used in all types of illumination and projection applications. Many applications require an illumination system with a high level of brightness in a small effective emitting area. This high level of brightness can be accomplished conventionally by adding more light sources. However, this can be both technologically impossible if there is a limited space for integrating light sources and economically unfeasible as it can be expensive to integrate and use multiple light sources. Accordingly, the present invention proceeds upon the desirability of increasing the brightness of a light source without increasing the number of the light source.

For example, micro-display based television (MDTV) has the potential of being low cost with large screen size. Traditional MDTVs are usually illuminated by arc lamps. Although this light source is the brightest at the lowest cost, the need to split the white light into 3 colors and the short lifetime make is less desirable. With advances in LED technology, the use of LED as the light source in MDTVs has to be considered to capture the long life feature of LEDs and other benefits such as instant ON. However, at the present time, LEDs are not bright enough for low cost application using small imaging panels or with larger screens. LED recycling scheme has been used to enhance the brightness of the light source, see U.S. Pat. No. 6,869,206 issued to Zimmerman et al. However, Zimmerman et al. describes enclosing the LEDs in a light-reflecting cavity with one light output aperture. Also, U.S. Pat. No. 6,144,536 issued to Zimmerman et al. describes a fluorescent lamp having a glass envelope with a phosphor coating enclosing a gas filled hollow interior. A portion of the light generated by the phosphor coating is recycled back to the phosphor coating. The claimed invention proceeds upon the desirability of providing higher brightness at the screen through efficient coupling of light from one or more light sources to the output, particularly by increasing the brightness by recycling using light pipes with one or more light sources and incorporating the same in a projector.

For example, LEDs are one type of light source used in many illumination applications such as general lighting, architectural lighting, and more recently in projection televisions. Due to the low brightness of the LEDs, most of the display or projector systems are etendue limited, which generally sets a ceiling to the maximum output at the screen. When used in projectors for example, LEDs must emit light in a small effective emitting area at a high brightness level in order to provide the requisite high light output on the projector screen. Specifically, the LEDs must provide an intense and bright light as measured in lumens at a small and solid angle in a small emitting area to be useful in projectors.

Although there had been tremendous advancement in the light emitting diode (LED) development, the output brightness of currently available LEDs is still not sufficient for most projection applications. Various methods had been proposed used to combine LED's with primary colors and recycling of output light to increase brightness. However, most of them these methods involve utilizing expensive components and/or results in a large, bulky device which greatly limits their applications. Therefore, the claimed invention proceeds upon the desirability of providing system and method for increasing the brightness by recycling using light pipes with one or more light sources (including but not limited to LEDs, arc lamps, UHP lamps, microwave lamps and the like) that solve these problems, and projectors incorporating the same. The projectors of the claimed invention can also multiplex colors to provide both colored pixel displays and time sequential displays.

SUMMARY OF THE INVENTION

Therefore, it is an object of the claimed invention to provide a recycling system and method for increasing the brightness using light pipes with one or more light sources.

Another object of the claimed invention is to provide a projector incorporating the recycling system as aforesaid.

In accordance with an exemplary embodiment of the claimed invention, a recycling system and method increases the brightness of light output using at least one recycling light pipe with at least one light source. The output end of the recycling light pipe reflects a first portion of the light back to the light source, a second portion the light to the input end of the recycling light pipe, and transmits the remaining portion of the light as output. The recycling system is incorporated into a projector to provide color projected image with increased brightness. The light source can be white LEDs, color LEDs, and dual paraboloid reflector (DPR) lamp.

Various other objects, advantages and features of the claimed invention will become readily apparent from the ensuing detailed description, and the novel features will be particularly pointed out in the appended claims.

BRIEF DESCRIPTION OF THE DRAWINGS

The following detailed description, given by way of example, and not intended to limit the claimed invention solely thereto, will best be understood in conjunction with the accompanying drawings in which like components or features in the various figures are represented by like reference numbers:

DETAILED DESCRIPTION OF THE EMBODIMENTS

With reference to the figures, exemplary embodiments of the claimed invention are now described. These embodiments illustrate principles of the invention and should not be construed as limiting the scope of the invention.

Efficient coupling of light from one or more light sources to the output provides higher brightness at the screen. Although the brightness of a light source cannot be increased in standard illumination systems, the claimed invention utilize recycling and combining of light sources to provide higher output intensities at the screen. The claimed invention provides high output from one or more light sources by recycling and combining of output from one or more light sources. The light sources applicable for the various configurations and embodiments of the claimed invention are arc lamps, UHP lamps, LEDs, microwave lamps, etc.

Figure 1:
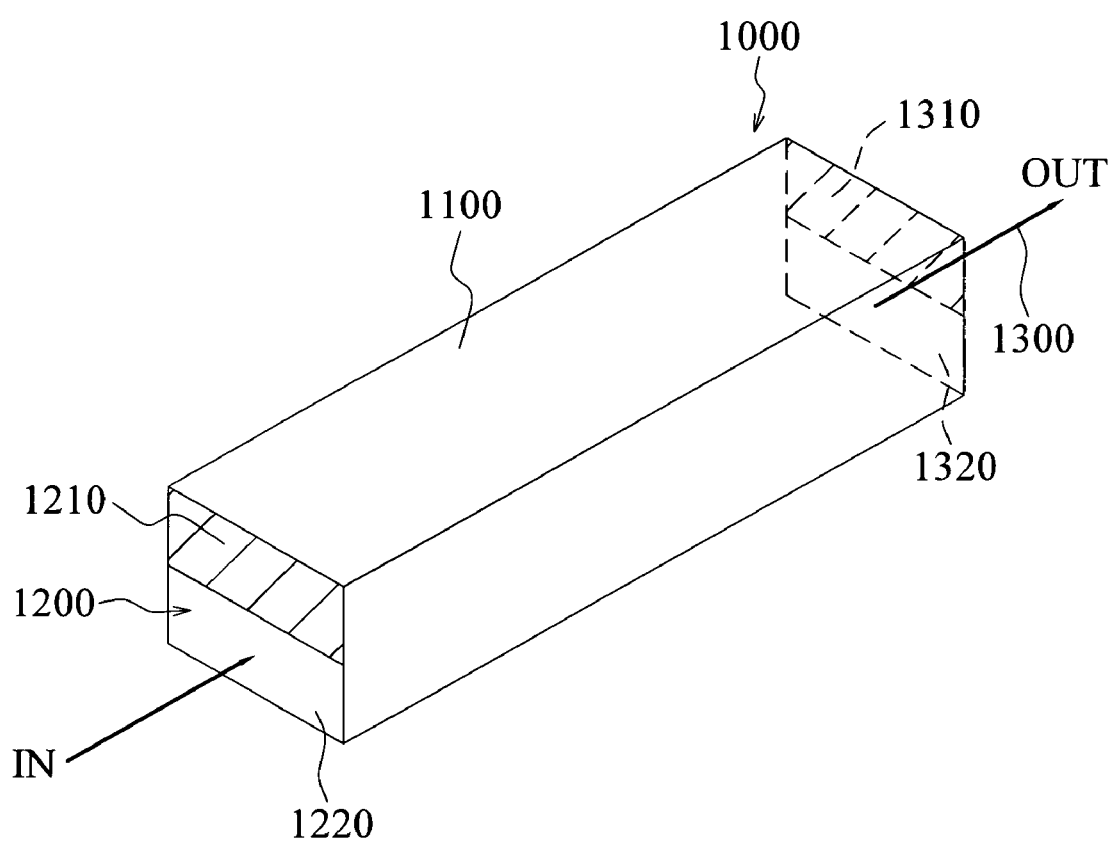
FIG. 1 shows a perspective view of a recycling system comprising a light pipe 1000 in accordance with an exemplary embodiment of the claimed invention.

Turning now to FIG. 1, there is illustrated in accordance with an exemplary embodiment of the claimed invention, a recycling system 1000 comprising a light pipe 1100. The light pipe 1100 can be solid or hollow. The light pipe 1100 can be straight or tapered. The input end 1200 of the light pipe 1100 comprises a reflective input surface 1210 or reflective input portion and an input aperture 1220 or transmissive portion. The reflective input surface 1210 comprises a part or portion of the input end 1200 which is reflective to reflect light and the input aperture 1220 comprises the remaining part or portion of the input end 1200 which is transparent to transmit the input light into the light pipe 1100. In accordance with an aspect of the claimed invention, the input aperture 1220 can be rectangular, circular or any suitable shape, and the reflective input surface 1210 can comprise an optional wave plate (not shown) to support polarized light systems.

The output end 1300 of the light pipe 1100 comprises a reflective output surface 1310 or reflective output portion and an output aperture 1320 or transmissive output portion. The reflective output surface 1310 comprises a part or portion of the output end 1300 which is reflective to reflect light and the output aperture 1320 comprises the remaining part or portion of the output end 1300 which is transparent to transmit or output light from the light pipe 1100. In accordance with an aspect of the claimed invention, the output aperture 1320 can be rectangular, circular or any suitable shape, and the reflective output surface 1310 can comprise an optional wave plate (not shown) to support polarized light systems.

In accordance with an exemplary embodiment of the claimed invention, the output aperture 1320 can be shaped to match the required shape and size of the illumination or projection system. For example, the output aperture 1320 can be circular or rectangular with aspect ratio of 6:9 or 4:3. The input light entering the light pipe 1100 through the input aperture 1220 is transmitted to the output end 1300 of the light pipe 1100 and partially exits the light pipe 1100 through the output aperture 1320. That is, part of the light will be reflected back to the input end 1200 and part of the light will exit the light pipe 1100 through the output aperture 1320. The light pipe 1100 reflects part of the light from the input aperture 1220 to the output aperture 1320. A light source that can be used at the input aperture 1220 can be an LED, output from a light pipe, output from phosphor excited by LEDs or lasers, or output from up-converting materials pumped by LEDs or lasers. The light source can also be arc lamps, microwave lamps, or lamps with reflectors.

Figure 2A:
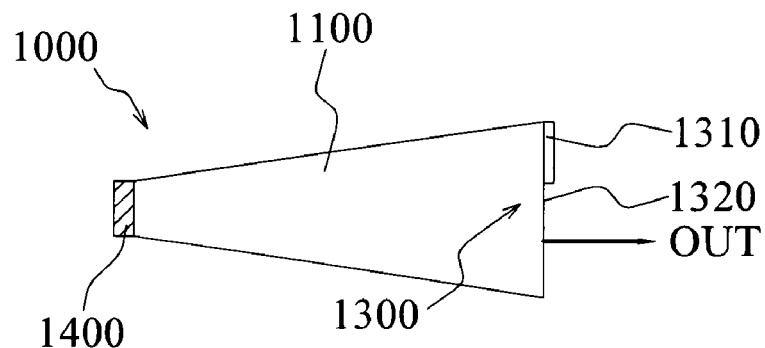
FIGS. 2(a)-(c) show cross-sectional views of recycling systems in accordance exemplary embodiments of the claimed invention.
Figure 2B:
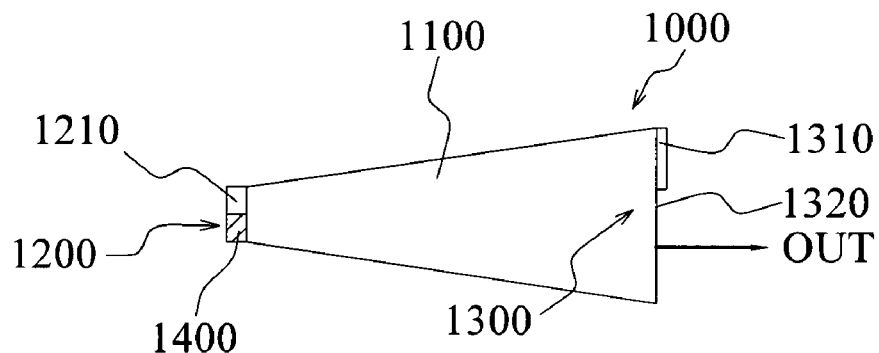
Figure 2C:
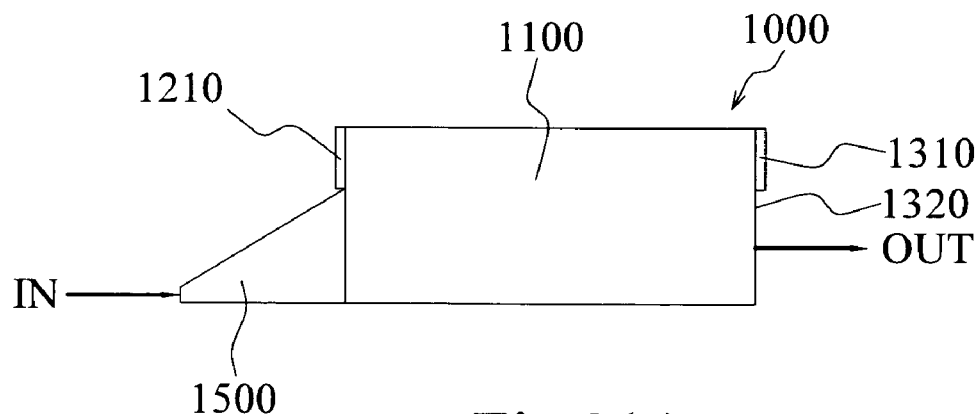

FIGS. 2(*a*)-(*c*) show various examples of recycling systems 1000 in accordance with embodiment of the claimed invention. FIG. 2(*a*) illustrates a cross-section view of a recycling system 1000 comprising a tapered light pipe 1100 with a LED 1400. The light input to the tapered light pipe 1100 is from the LED 1400. The output end 1300 of the tapered light pipe 1100 comprises the output aperture 1320 for transmitting a portion of the light and the reflective output surface 1310 for recycling the remaining portion of the light. The light output from the LED 1400 is coupled to the tapered light pipe 1100 and part of the light is reflected back into the LED 1400. Part of the light is reflected by (or recycled by) the LED 1400 as light output back into the tapered light pipe 1100.

FIG. 2(*b*) shows another example of the recycling system 1000 in accordance with an embodiment of the claimed invention, in which the input end 1200 of the tapered light pipe 1100 is larger than the LED 1400. The light input to the tapered light pipe 1100 is from the LED 1400. The output end 1300 of the tapered light pipe 1100 comprises the output aperture 1320 for transmitting a portion of the light and output reflective surface 1310 for recycling the remaining portion of light. The excess area or the reflective input surface 1210 of the input end 1200 is reflective for recycling a portion of the light, as with FIG. 1.

FIG. 2(*c*) shows an example of the recycling system 1000 in accordance with an embodiment of the claimed invention, in which the input light to the light pipe 1100 is from an output of an input light pipe 1500 (which can be straight, tapered, hollow or solid like the light pipe 1100) coupled from a light source, e.g. a dual paraboloid reflector system, elliptical system, etc. Although not shown, the claimed recycling system 1000 can utilize other light sources including but not limited to LEDs, microwave lamp, phosphor excited by short wavelength LED or laser, or up-converting materials pumped by long wavelength LED or lasers, and the like.

Figure 3:
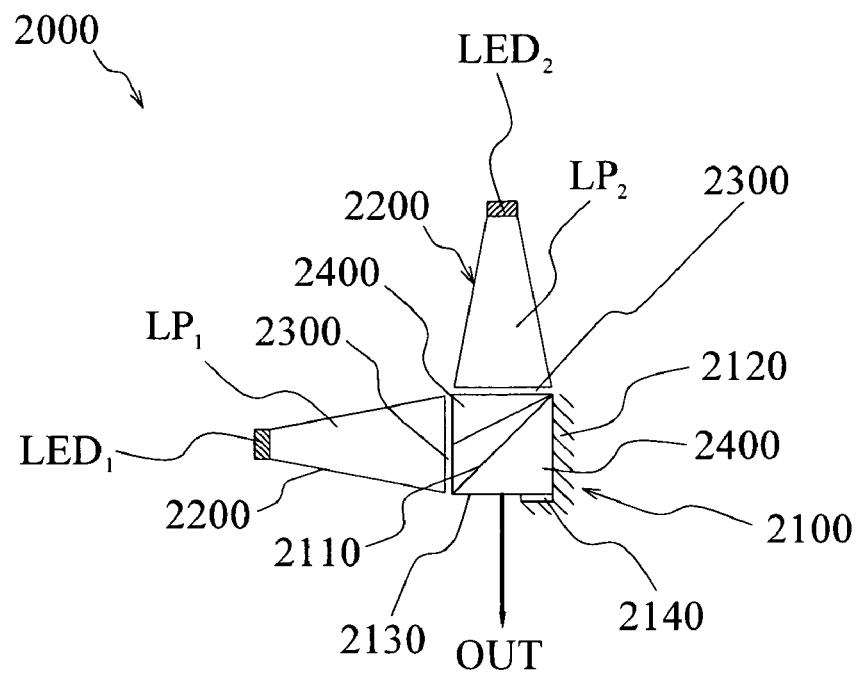
FIG. 3 shows a cross-sectional view of a recycling system in accordance with an exemplary embodiment of the claimed invention comprising a 6-sided beam combiner and at least two light pipes.
Figures 4A, 4B, 4C:
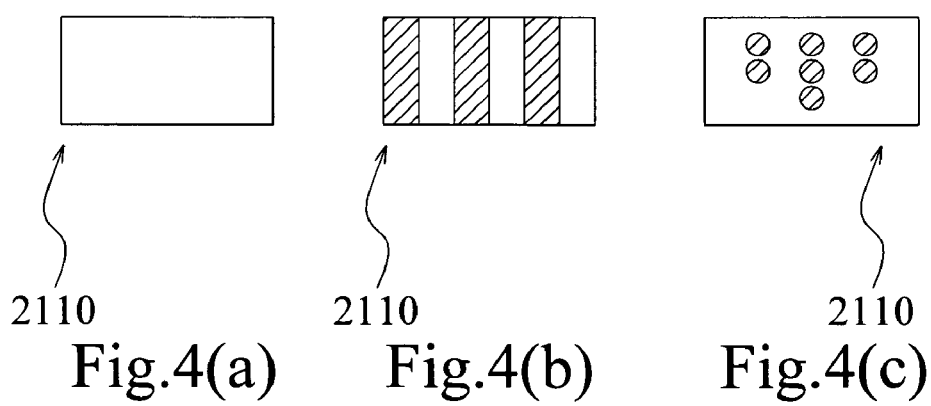
FIGS. 4(a)-(c) show perspective views of the diagonal surface of the 6-sided beam combiner coated with partial reflective coating or spatially reflective portions in accordance with an exemplary embodiment of the claimed invention.

Turning now to FIG. 3, there is illustrated a recycling system 2000 in accordance with an exemplary embodiment of the claimed invention. The recycling system 2000 comprises a 6-sided beam/light combiner 2100 and at least two light pipes (labeled $LP_1$ and $LP_2$). The $LP_1$ and $LP_2$ are substantially similar to the light pipe 1100 of the recycling system 1000 in FIG. 1. The recycling system 2000 can combine multiple light sources. In FIG. 3, the output of the recycling system 2000 is combination of two light sources. Each light source 2200 comprises an LED 1400 (labeled $LED_1$ and $LED_2$) and a light pipe $LP_1$ or $LP_2$. The light from $LED_1$ (1400) is coupled to the $LP_1$ (1100) into the light combiner 2100. The light combiner 2100 is polished on all six sides such that the surfaces are used for both transmission and total internal reflections (TIR). The triangular surfaces 2400 of the light combiner 2100 are also polished such that the light combiner 2100 acts as a waveguide, thereby guiding the light from the light pipes $LP_1$, $LP_2$ (1100). In accordance with an exemplary embodiment of the claimed invention, the diagonal surface 2110 of the beam combiner 2100 is coated to provide a partial reflective/transmissive surface. The diagonal surface 2110 can be coated with partial reflective coating as in FIG. 4(*a*) or spatially reflective portions as shown in FIGS. 4(*b*) and (*c*). The percentage of reflection versus transmission can be optimized for maximum output depending on the application. In accordance with an aspect of the claimed invention, the beam combiner 2100 with all six polished sides/faces/surfaces acts as waveguides rather than bulk optics. The dimension of the $LP_1$ (1100) output is matched to a face of the beam combiner 2100. Part or portion of the light from the $LP_1$ (1100) is reflected to the $LP_2$ (1100) and recycled by $LED_2$ (1400). A part or portion of the light from the $LP_2$ (1100) is reflected to the $LP_1$ (1100) and recycled by $LED_1$ (1400). A part of portion of the light from $LP_1$, $LP_2$ (1100) exits the recycling system 2000 as an output light through an output aperture 2130 and remaining portion of the light is reflected by an end reflector 2120 back into the recycling system 2000. The recycling system 2000 can optionally comprise a reflective surface or reflective aperture 2140 for recycling a portion of the light output by reflecting a portion of the light output back into the recycling system 2000. To additionally promote TIR, in accordance with an exemplary embodiment of the claimed invention, the recycling system 2000 comprises optional air gap or low index glue 2300 between one or more optical components, such as between the $LP_1$ (1100) and the beam combiner 2100 and $LP_2$ (1100) and the beam combiner 2100.

Figure 5:
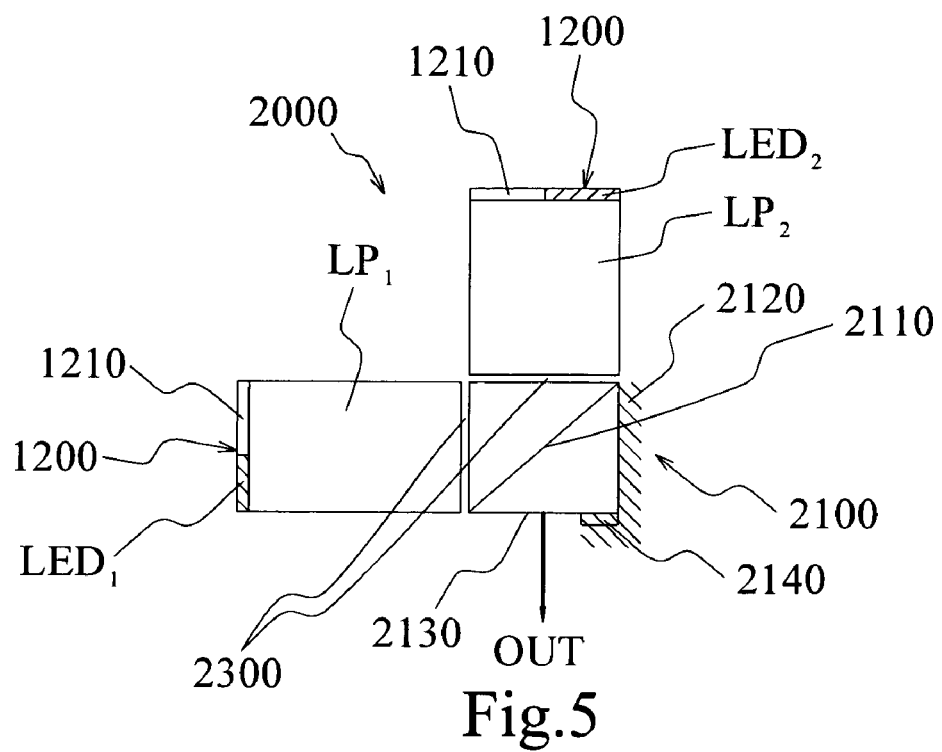
FIGS. 5-6 show cross-sectional views of the recycling system of FIG. 3 incorporating at least two light pipes of FIG. 1 in accordance with exemplary embodiments of the claimed invention.
Figure 6:
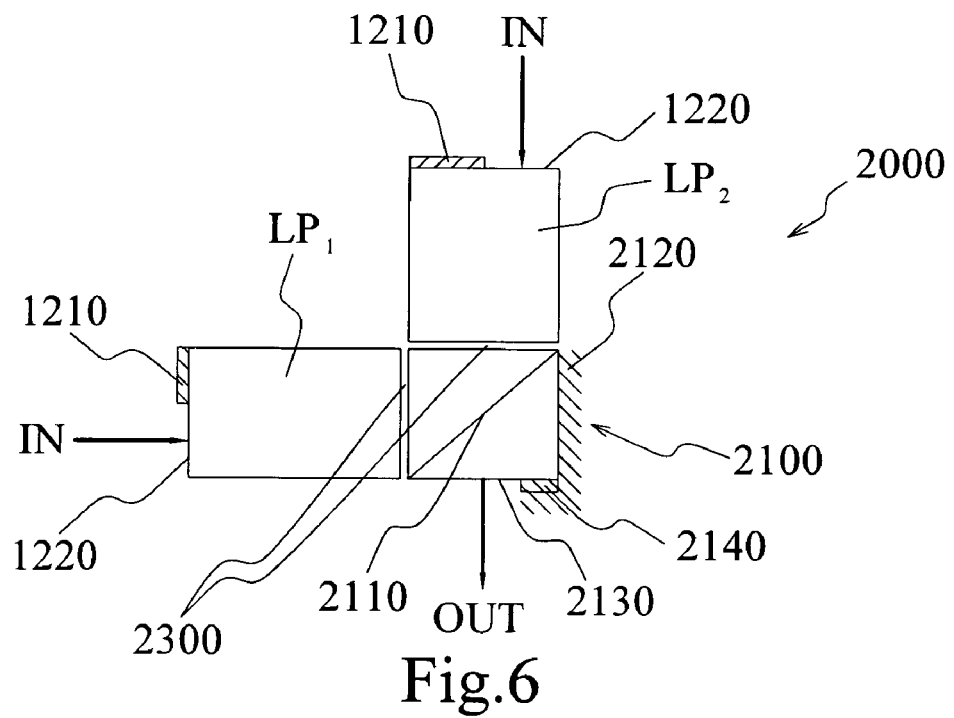
Figure 7:
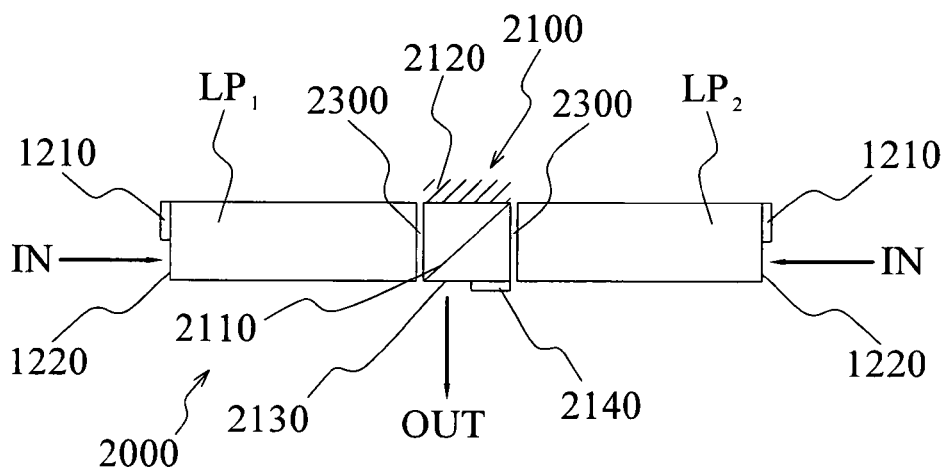
FIG. 7 shows a cross-sectional view of the recycling system of FIG. 6 with optical components placed in a linear fashion in accordance with an exemplary embodiment of the claimed invention.

Turning now to FIGS. 5 and 6, in accordance with an exemplary embodiment of the claimed invention, there is illustrated the recycling system 2000 of FIG. 3 incorporating the light pipes 1100 of FIG. 1. Optical components that are common to the recycling system 1000 of FIG. 1, and the recycling systems 2000 of FIGS. 3, 5 and 6 will not be described again herein. In FIG. 5, each LED 1400 ($LED_1$, $LED_2$) couples or covers a part or portion of the input end 1200 of the light pipe 1100 ($LP_1$, $LP_2$). The remaining part or portion of the input end 1200 is coated with a reflective coating to provide the input reflective surface 1210. The output of the recycling system 2000 of FIG. 5 is a combination of the two LED inputs. In FIG. 6, the LEDs 1400 (LED$_1$, LED$_2$) in FIG. 5 are replaced with light sources, including but not limited to output from light pipes, light lamps (arc lamps, microwave lamps, etc.) focused by reflectors or lenses, etc. Alternatively, in accordance with an exemplary embodiment of the claimed invention, the optical components of the recycling system of FIG. 6 can be placed in a linear fashion, as shown in FIG. 7. To additionally promote TIR, in accordance with an exemplary embodiment of the claimed invention, the recycling system 2000 of FIGS. 5-7 comprises air gap or low index glue 2300 between one or more optical components, such as between LP$_1$ (1100) and the beam combiner 2100 and LP$_2$ (1100) and the beam combiner 2100.

Figure 8:
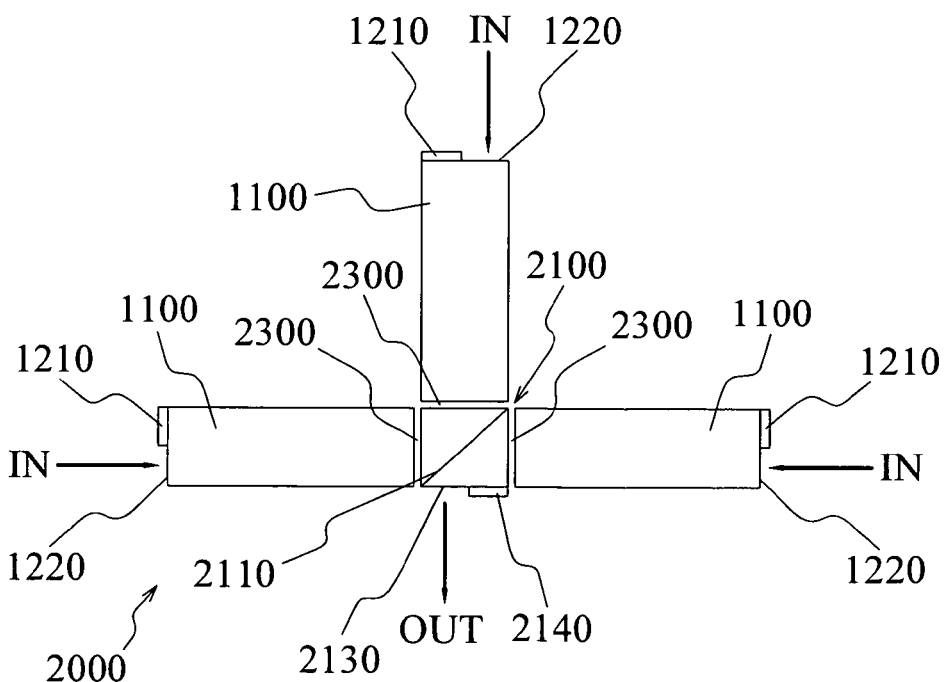
FIG. 8 shows a cross-sectional view of the recycling system of FIGS. 6-7 comprising at least three light pipes of FIG. 1 in accordance with an exemplary embodiment of the claimed invention.

In accordance with an exemplary embodiment of the claimed invention, as shown in FIG. 8, the recycling system 2000 of FIG. 6 or 7 comprises at least three light pipes of FIG. 1. That is, the end reflector 2120 of the recycling system 2000 of FIG. 6 or 7 is replaced with the light pipe 1100 in FIG. 8. The output of the recycling system 2000 in FIG. 8 is combination of three light sources. The light source that can be used at the input aperture 1220 can be an LED, output from a light pipe, output from phosphor excited by LEDs or lasers, or output from up-converting materials pumped by LEDs or lasers, etc. To additionally promote TIR, in accordance with an exemplary embodiment of the claimed invention, the recycling system 2000 of FIG. 8 comprises optional air gap or low index glue 2300 between one or more optical components.

Figure 9:
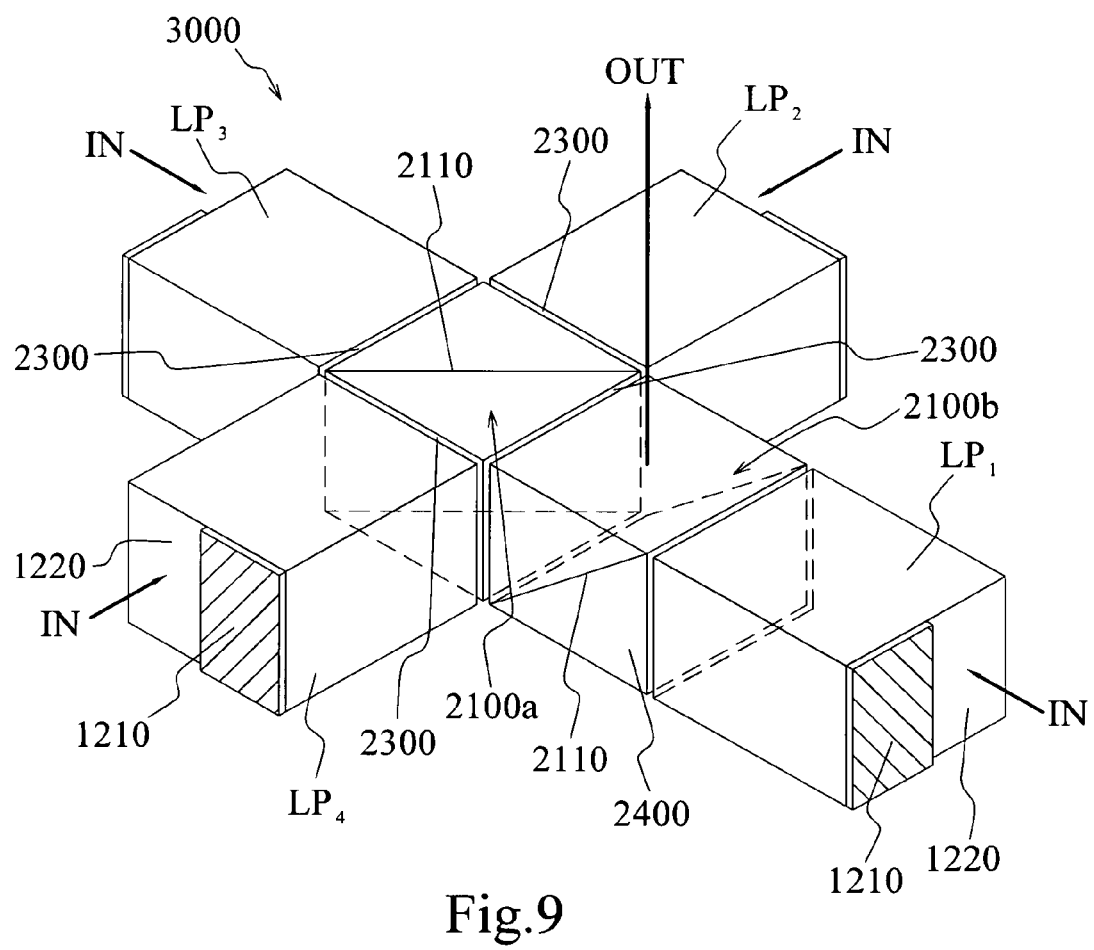
FIG. 9 shows a perspective view of the recycling system comprising at least four light pipes of FIG. 1 and at least two 6-sided beam combiners in accordance with an exemplary embodiment of the claimed invention.

In accordance with an exemplary embodiment of the claimed invention, FIG. 9 shows a recycling system 3000 comprising at least four light pipes 1100 and at least two beam combiners 2100. The recycling system 3000 combines output from at least four sets of light sources into a single output. Although FIG. 9 shows the recycling system 3000 with two beam combiners 2100, it is appreciated that the recycling system 2000 of FIG. 9 can comprise two or more beam combiners 2100. In accordance with an aspect of the claimed invention, the direction of the diagonal surface 2110 of the two beam combiners 2100 are different. The direction of the diagonal surface 2110 of the beam combiner (1) is oriented to recycle the light and the direction of the diagonal surface 2110 of the beam combiner (2) is oriented to output the light. The triangular surfaces 2400 of the beam combiners 2100 are polished such that the beam combiners 2100 act as waveguides, thereby guiding the light from the four light pipes 1100 (LP$_1$, LP$_2$, LP$_3$, LP$_4$). To additionally promote TIR, in accordance with an exemplary embodiment of the claimed invention, the recycling system 3000 of FIG. 9 comprises air gap or low index glue 2300 between one or more optical components, such as between the LP$_1$ (1100) and the beam combiner (1) and the LP$_2$ (1100) and the beam combiner (1).

Figure 10:
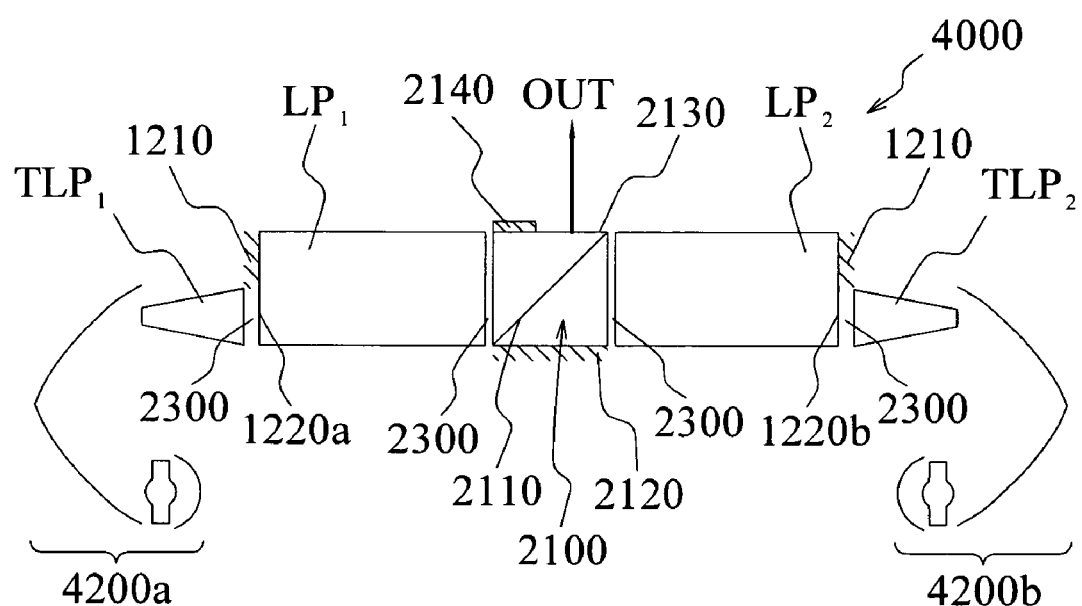
FIG. 10 is a cross-sectional view of a recycling system comprising a beam combiner, two light pipes, and two DPR based light sources in accordance with an exemplary embodiment of the claimed invention.

Turning now to FIG. 10, there is illustrated a recycling system 4000 comprising a beam combiner 2100, two light pipes 1100, and two light sources 4200 in accordance with an exemplary embodiment of the claimed invention. The light sources 4200 are dual paraboloid reflector (DPR) lamps. The first light source DPR lamp$_1$ 4200 is coupled to a first tapered light pipe TLP$_1$ (4100), which is then coupled to the input aperture 1220 of the light pipe LP$_1$ (1100). The second light source DPR lamp$_2$ 4200 is coupled to a second tapered light pipe TLP$_2$ (4100), which is then coupled to the input aperture 1220 of the light pipe LP$_2$ (1100). The operation of the light pipes 1100 (LP$_1$ and LP$_2$), and the beam combiner 2100 in the recycling system 4000 are similar to the light pipes 1100 (LP$_1$ and LP$_2$), and the beam combiner 2100 in the recycling system 2000 of FIGS. 6-7. The recycling system 4000 combines the output of the second set of light source 4200 with is the first set of light source 4200 using the beam combiner 2100 to provide a single output. To additionally promote TIR, in accordance with an exemplary embodiment of the claimed invention, the recycling system 4000 of FIG. 10 comprises air gap or low index glue 2300 between one or more optical components, such as between the LP$_1$ (1100) and the beam combiner 2100 and the TLP$_2$ (1100) and the LP$_2$ (2100).

Figure 11:
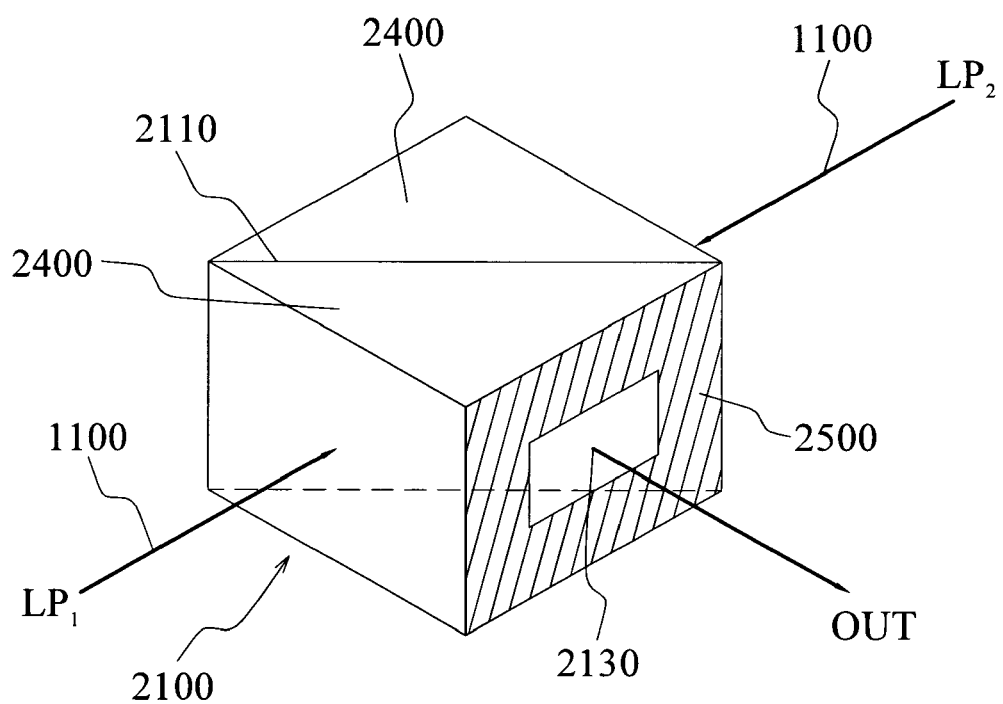
FIG. 11 is a perspective view of the beam combiner in accordance with an exemplary embodiment of the claimed invention.

In accordance with an exemplary embodiment of claimed invention, as shown in FIG. 11, an output face or surface 2500 of the beam combiner 2100 of the claimed recycling system (2000, 3000, 4000) is a reflective output surface 2500 with a transmissive opening or output aperture 2130. In accordance with an aspect of the claimed invention, the shape, size and location of the output aperture 2130 is configurable to match the needs of specific applications.

Figure 12:
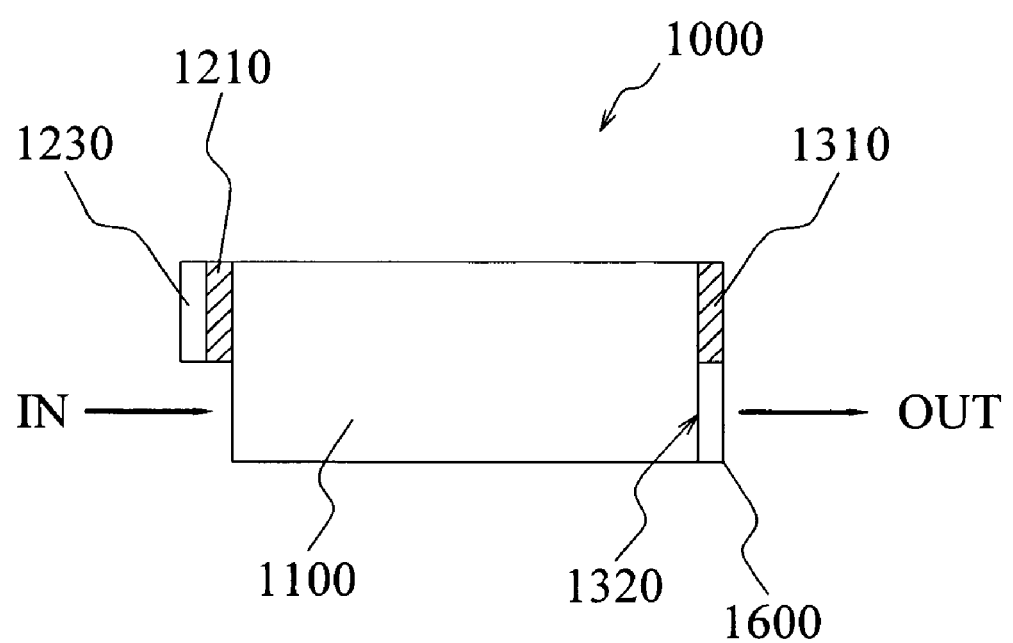
FIG. 12 is a cross-sectional view of the recycling system of FIG. 1 comprising a reflective polarizer in accordance with an exemplary embodiment of the claimed invention.

Turning now to FIG. 12, in accordance with an exemplary embodiment of the claimed invention, the recycling system 1000 of FIG. 1 additionally comprises a reflective polarizer 1600 coupled to the output aperture 1320 of the light pipe 1100 to provide polarized output. To increase the efficiency, in accordance with an aspect of the claimed invention, the reflective input surface 1210 of the light pipe 1100 can comprise an optional wave plate 1230.

Figure 13:
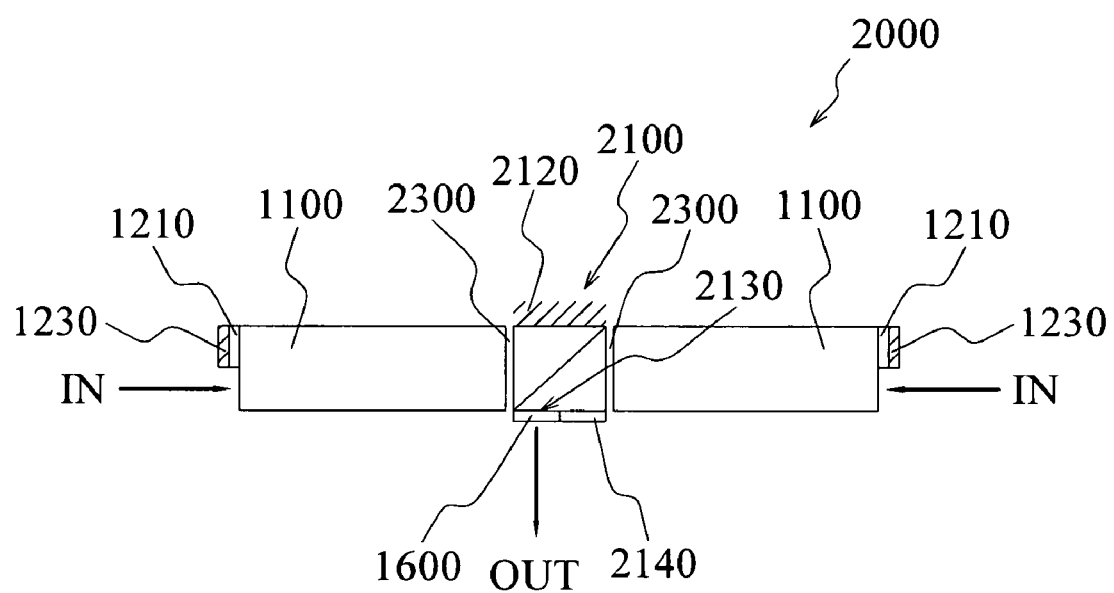
FIG. 13 is a cross-sectional view of the recycling system of FIG. 7 comprising a reflective polarizer in accordance with an exemplary embodiment of the claimed invention.

In accordance with an exemplary embodiment of the claimed invention, as shown in FIG. 13, the recycling system 2000 of FIG. 7 additionally comprises a reflective polarizer 1600 coupled to the output aperture 2130 of the beam combiner 2100 to provide polarized output. To increase the efficiency, in accordance with an aspect of the claimed invention, the reflective input surfaces 1210 of the light pipes 1100 can comprise an optional wave plate 1230. The beam combiner 2100 of the recycling system 2000 of FIG. 13 combines two separate light sources together to produce a single output of polarized light.

Figure 14:
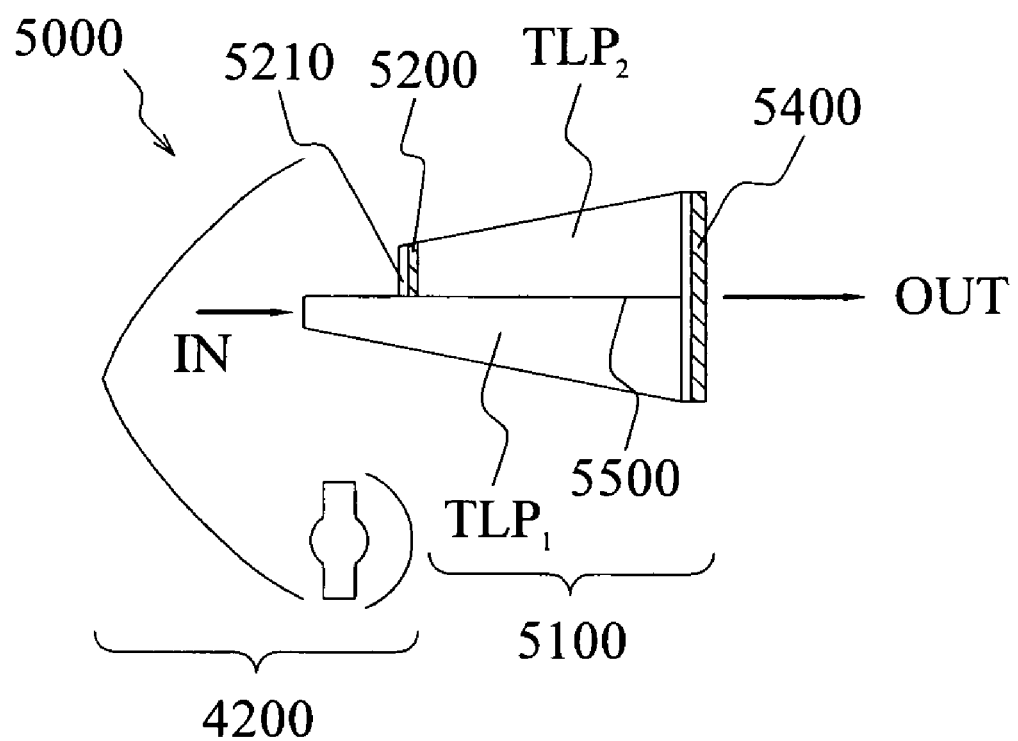
FIG. 14 is cross-sectional view of the recycling system comprising a tapered polarization light pipe system and a DPR lamp in accordance with another exemplary embodiment of the claimed invention.
Figure 15A:
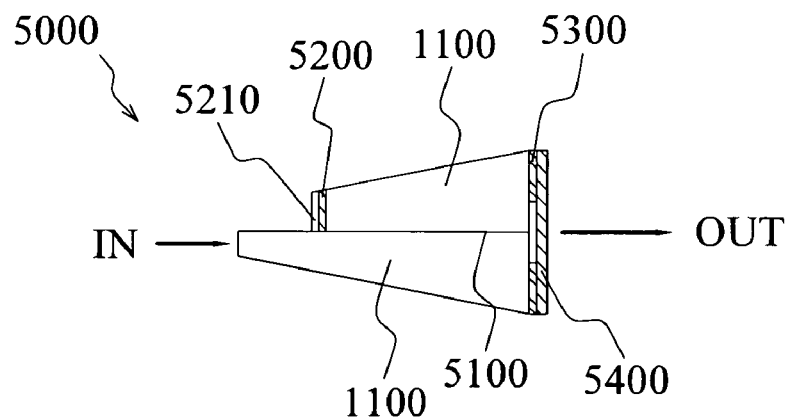
FIG. 15(a) is a cross-sectional view of the tapered polarization light pipe system of FIG. 14 in accordance with an exemplary embodiment of the claimed invention.
Figure 15B:
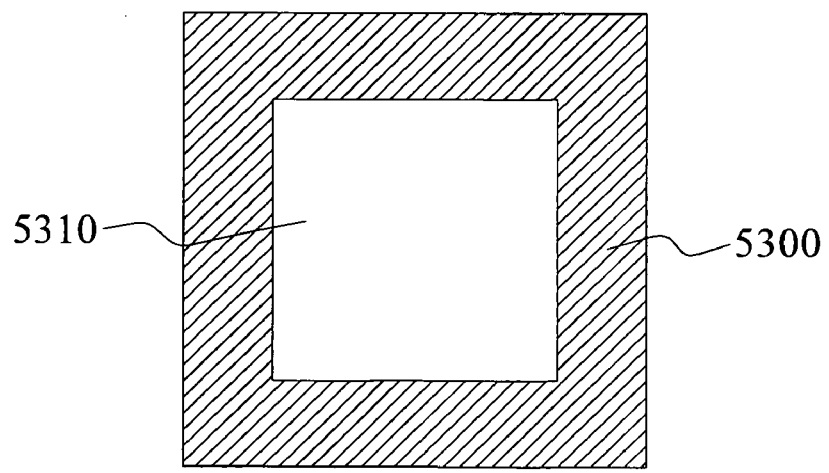
FIG. 15(b) is a perspective view of the reflective aperture of the tapered polarization light pipe system of FIG. 15(a) in accordance with an exemplary embodiment of the claimed invention.

Turning now to FIGS. 14, 15(a)-(b), there is illustrated a recycling system 5000 in accordance with an exemplary embodiment of the claimed invention. The recycling system 5000 comprises a tapered polarization light pipe system 5100 with recycling configured to be used with a DPR lamp or system 4200. The tapered polarization light pipe system 5100 comprises two tapered light pipe 1100 (TLP$_1$, TLP$_2$) with common surface filled with transparent, preferably index matching, glue, epoxy, or fluid 5500. The input light entering the tapered light pipe 1100 (TLP$_1$) is coupled into the tapered light pipe 1100 (TLP$_2$) and exits the TLP$_2$ as a polarized output. A part or portion of the output light is reflected by the optional reflective aperture 5300. An example of the output reflective aperture is shown in FIG. 15(b), the shape and size of the transmissive opening 5310 can vary depending on the application. The unused polarization light is reflected back to the DPR lamp 4200 by the reflective polarizer 5400. The TLP$_2$ 1100 of the tapered polarization light pipe system 5100 comprises a reflective surface 5200 with an optional wave plate 5210 for reflecting a portion of the light back to the reflective polarizer 5400.

Figure 16:
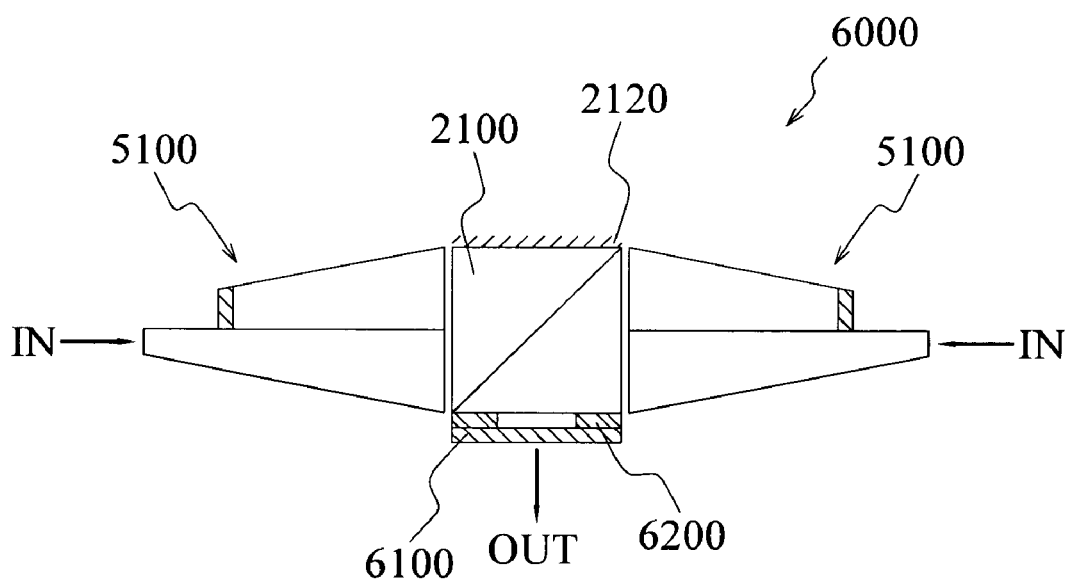
FIG. 16 is a cross-sectional view of the recycling system comprising at least two tapered polarization light pipe system of FIG. 14 and a beam combiner in accordance with an exemplary embodiment of the claimed invention.

In accordance with an exemplary embodiment of the claimed invention, the recycling system 6000 of FIG. 16 comprises the beam combiner 2100 and at least two tapered polarization light pipe systems 5100 of FIG. 15 acting as light sources. It is appreciated that since the output of the two tapered polarization light pipe systems 5100 of FIG. 16 are coupled to the beam combiner 2100, the tapered polarization light pipe systems 5100 of FIG. 16 do not require the reflective polarizer 5400 and the optional reflective aperture 5300. The output end of the beam combiner 2100 of FIG. 16 comprises the reflective polarizer 6100 and the optional reflective aperture 6200, which are similar to the reflective polarizer 5400 and the optional reflective aperture 5300 with the transmissive opening 5310. Although not shown in FIG. 16, each tapered polarization light pipe system 5100 of FIG. 16 can be coupled to a DPR lamp 4200, as shown in FIG. 14. The beam combiner 2100 of the recycling system 6000 can combine at least two light sources 5100 into a single polarized output beam. It is appreciated that the recycling system 6000 can combine more than two light sources 5100 using one or more beam combiners 2100, similar to the recycling system 300 of FIG. 9.

LED projection systems are advancing in a rapid pace as the output of the LEDs are increasing. The common LED projection systems use three colored LEDs, namely, red, green, and blue. The output from each LED is combined into a single output for time sequential multiplexing to produce the color output image. The three colored LEDs are made from different materials and have different temperature dependencies. To maintain constant color at the screen, a feedback control is necessary making the typical LED projection system expensive and complex. Traditional illumination using white LED has been considered to be inferior in color as white LEDs do not have sufficient red content.

Figure 17:
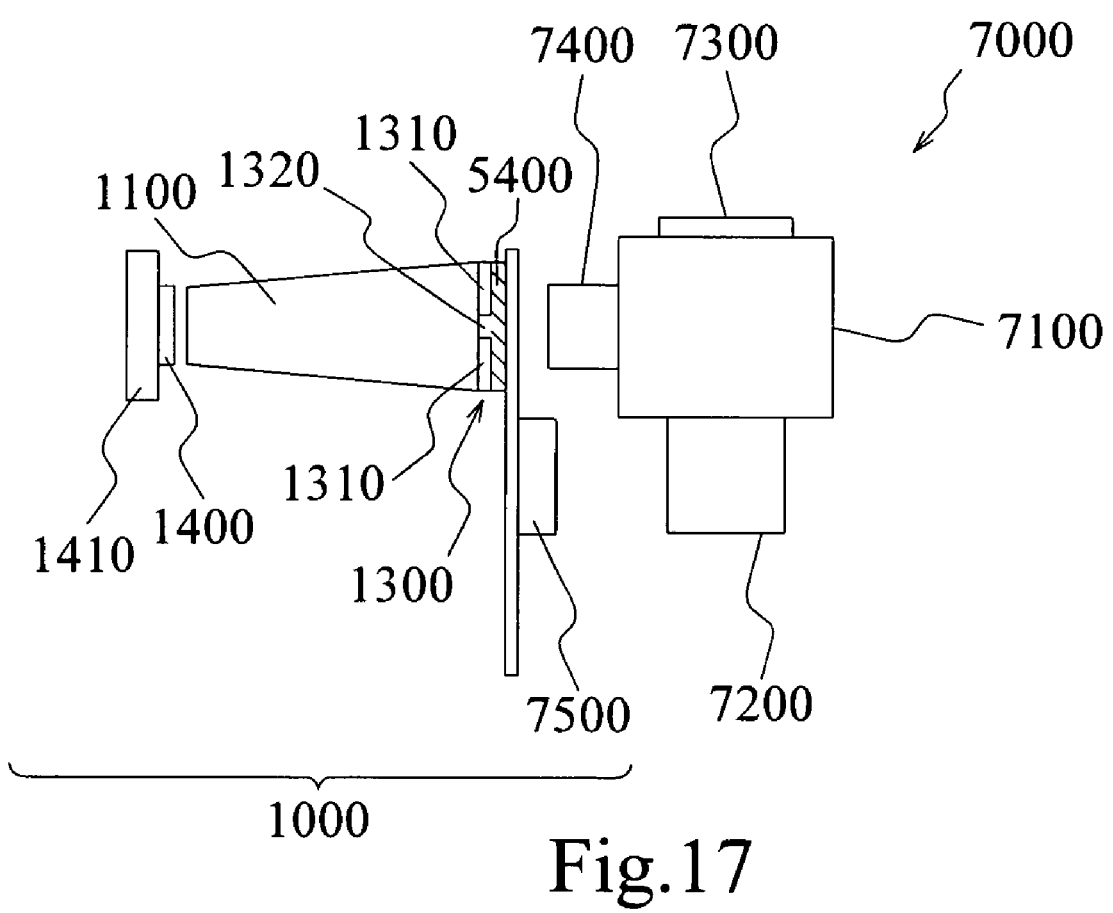
FIG. 17 is a cross-sectional view of a LED projector incorporating a recycling system in accordance with an exemplary embodiment of the claimed invention.

The claimed invention overcomes these limitations with using white LEDs in a traditional illumination and projections systems. In accordance with an exemplary embodiment of the claimed invention, a recycled white LED projector is provided with enhanced red color. Turning now to FIG. 17, there is illustrated a projector 7000 incorporating the recycling system in accordance with an exemplary embodiment of the claimed invention. The projector 7000 comprises an imager panel 7300, a projection engine 7100, a projection lens 7200, and a relay lens 7400. The projector 7000 utilizes light emitted by the LED 1400 with a portion of emitted light recycled back into the LED 1400 for increased brightness using a recycle system 1000. Although FIG. 17 shows the projector 7000 incorporating the recycling system 1000, it is appreciated that the projector 7000 can incorporate any of the recycle system discussed herein. The output of the tapered light pipe 1100 is coupled into the projection engine 7100 through a relay lens 7400 and a color-wheel 7500 such that it forms a sequential color system.

The LED 1400 can be a white phosphor LED 1400, white phosphor pumped by LED or laser, preferably blue or UV. It is appreciated that the LED 1400 is not limited to the white LED, the claimed invention can utilize colored LEDs to provide LED projector with color enhancements as described herein. Preferably, the LED 1400 is mounted on a heatsink substrate 1410. The output of the LED 1400 is coupled into a light pipe 1100, which can be hollow or solid, tapered or straight so that the output can be tailored to a specific application. The light pipe 1110 is placed at the output of the LED 1400 and is aligned for maximum coupling efficiency. A portion of the surface of the output end 1300 of the light pipe 1100 is coated with a reflective coating 1310 or using a mirror or reflector 1310, such that only a percent of the output of the light pipe 1100 is coupled to the projection engine 7100 through the color-wheel 7500. The output of the light pipe 1110 is then projected onto the imaging or imager panel 7300 using the relay lens 7400 and projection engine 7100. The final image at the imaging panel 4300 is then projected onto the screen (not shown) through the projection lens 7200.

In accordance with an exemplary embodiment of the claimed invention, the output of the light pipe 1110 can be coated with an output coating that reflects only selective wavelengths and transmits all other wavelengths of light, such that the desired color is enhanced. For example, the output end 1300 of the light pipe 1100 can be coated to reflect blue light and transmit all other colored light. That is, the recycling system 1000 will enhance the recycling of blue light, thereby enhancing the other colors that are transmitted to the projection engine 7100.

In accordance with an exemplary embodiment of the claimed invention, the color wheel 7500 comprises two or more segments with filters of different color, such as red, blue, and green for a 3-color system, or red, green, blue and colorless. Hence, the colored projector 7000 utilizes a sequential color system in which each color is displayed in sequence to produce a colored image.

In accordance with an exemplary embodiment of the claimed invention, the LED 1400 is driven with a DC current. Alternatively, the LED 1400 can be driven with varying current in synchronism with the color wheel 7500. For example, the LED 1400 can have different current values as a function of which color segment of the color wheel 7500 is in front of the light pipe 1100. In a particular embodiment, higher current is applied when the red segment is in front of light pipe, such that the lack of red color is overcome by the higher current.

In accordance with an exemplary embodiment of the claimed invention, the imager panel 7300 can be a digital mirror device (DMD), such as DMDs that are manufactured by Texas Instruments or other vendors. In accordance with an exemplary embodiment of the claimed invention, the imager panel 7300 can be a liquid crystal on silicon (LCOS) panel. The recycling system 1000 of FIG. 17 can comprise an optional reflective polarizer 5400, which is placed at the output end 1300 of the light pipe 1100 such that unwanted polarization of light can be reflected back into the light pipe 1100 for recycling.

In accordance with an exemplary embodiment of the claimed invention, the white phosphor of the LED 1400 can be driven by blue light emitted by the LED 1400. In the process of recycling by the recycling system 1000, the recycled blue light is reabsorbed by the phosphor of the LED 1400 and can be re-emitted as green and red light. As a result, the recycled light has a lower blue output, and higher red and green output.

In accordance with an exemplary embodiment of the claimed invention, an application requiring higher output power, the projector 7000 utilizes multiple LEDs 1400 to drive a single or multiple phosphor segments such that the emitted light can be coupled into the light pipe 1100 of the recycling system 1000. It is appreciated that output from multiple LEDs 1400 can also be combined using a prism, light pipe and other comparable optical components, each acting as a waveguide, to produce a higher output at the screen (not shown). For example, the prism can act as a waveguide if each side of the prism are reflectively polished to promote TIR.

The advantages of using light from white phosphor LED includes:
1. The white phosphor LED has a shorter wavelength, larger band gap, and thus can operate at higher junction temperature, easing the heat-sinking requirement.
2. Single colored LED can be used, thereby eliminating the need for multiplexing multiple colored LEDs.
3. The color wheel is a very well developed component and has very long life.
4. The standard projection engine architecture can be used, there are many vendors with year experience in mass producing these standard projection engine.
5. Many vendors produce white phosphorus LEDs.
6. A large emitting area can be obtained using multiple, smaller white phosphorous LEDs. The emission area does not have the blank seams between the LEDs, which can reduce the recycling efficiency.

Figure 18:
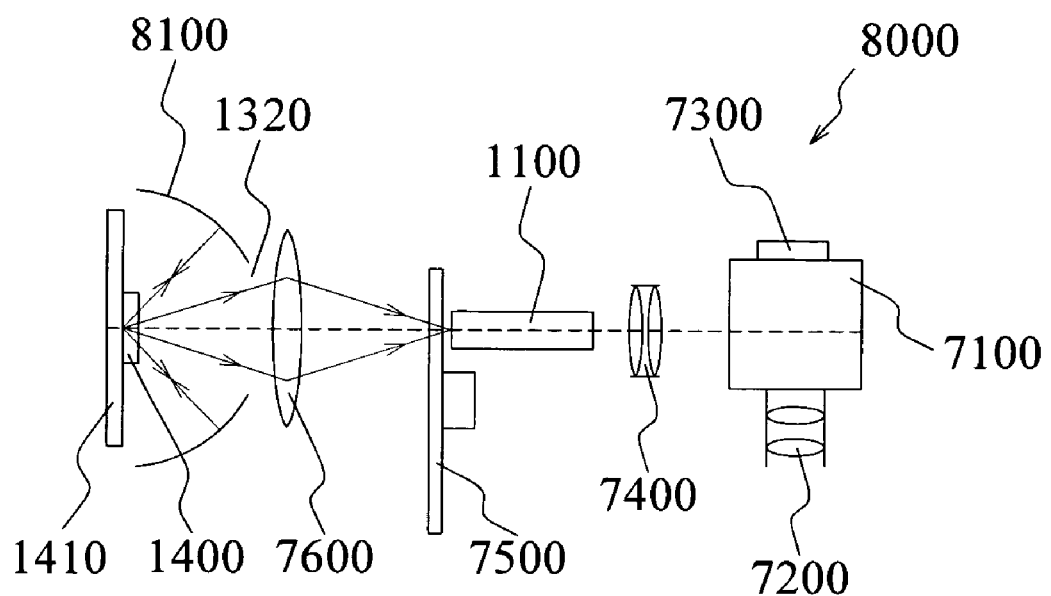
FIG. 18 is a cross-sectional view of a LED projector incorporating a recycling system in accordance with an exemplary embodiment of the claimed invention.

Turning now to FIG. 18, in accordance with an exemplary embodiment of the claimed invention, there is illustrated a LED projector 8000 additionally comprising a recycling reflector 8100 for recycling light. The recycling reflector 8100 reflects a portion of the LED output back into the LED 1400 for recycling light. The LED 1400 can be a white or colored LED. Preferably, the recycling reflector 8100 is a spherical, or toroidal, or elliptical reflector in which LED is image back into itself. An opening of the recycling reflector 8100 is used as the output aperture 1320. In accordance with an aspect of the claimed invention, the size of opening can be varied to achieve varying amounts of recycling. The light output is coupled by using a collection lens 7600 or lens system with more than one lens 7600, and is then focused into a light pipe 1100. The light pipe 1100 homogenizes the light producing uniform intensity profile at the output of the light pipe 1100. The rest of the optical components of the LED projector 8000 is similar to the LED projector 7000 of FIG. 17. The color wheel 7500 can be placed either at the input or output end of the light pipe 1100.

Figure 19:
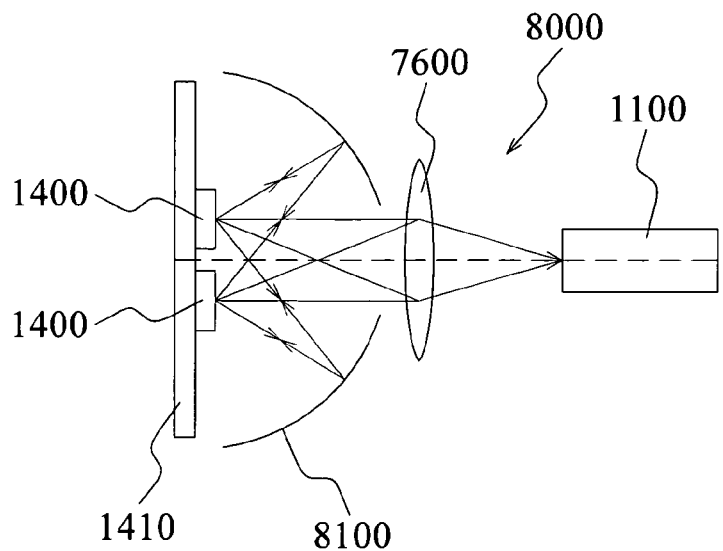
FIG. 19 is a cross-sectional view of the LED projector of FIG. 18 utilizing two LEDs in accordance with an exemplary embodiment of the claimed invention.
Figure 20:
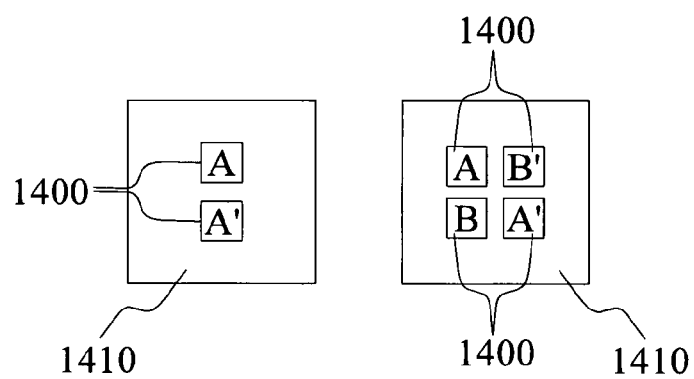
FIG. 20 is perspective views of two and four LEDs mounted on the heatsink substrate in accordance with an exemplary embodiment of the claimed invention.

In accordance with an exemplary embodiment of the claimed invention, FIG. 19 shows the LED projector 8000 utilizing more than one LED 1400. The recycling reflector 8100 images one LED onto the other LED increasing the recycling efficiency of the LED projector 8000. FIG. 20 show two or four LEDs 1400 mounted on the heatsink substrate 1410 which can be used with the LED projector 8000. In the four LED case, the recycling reflector 8100 images a first LED onto a second LED which is positioned diagonally with respect to the first LED, for example, LED A images onto LED A' and LED B' images onto LED B. The collection lens 7600 couples the light output of the LEDs 1400.

Figure 21:
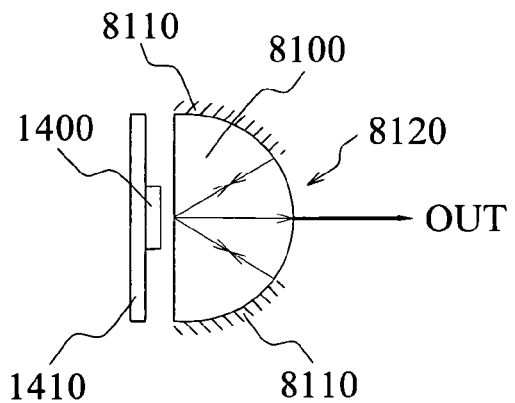
FIG. 21 is a cross-sectional view of the recycling reflector as a solid optical component in accordance with an exemplary embodiment of the claimed invention.

In accordance with an exemplary embodiment of the claimed invention, the recycling reflector 8100 can be a solid optical component, as shown in FIG. 21, such as a piece of glass with a partially reflective and transmissive surface with curvatures optimized for maximum output efficiency. The solid glass 8100 placed at the output of the LED 1400 is aligned for maximum recycling of light. A portion of the output surface of the solid glass 8100 is coated with reflective coating to provide a reflective surface 8110 and the remaining portion is transmissive to serve as the output aperture 8120. The output aperture 8120 can be formed from the same continuous surface as the reflective surface 8110, and can be designed to have different curvatures for optimum coupling.

Figure 22:
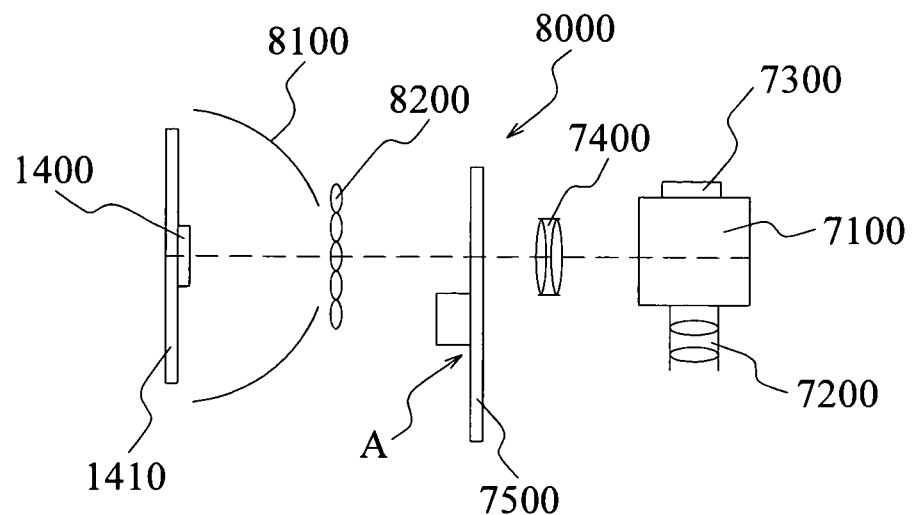
FIG. 22-24 are cross-sectional views of the light projector comprising lenslet array in accordance with an exemplary embodiment of the claimed invention.
Figure 23:
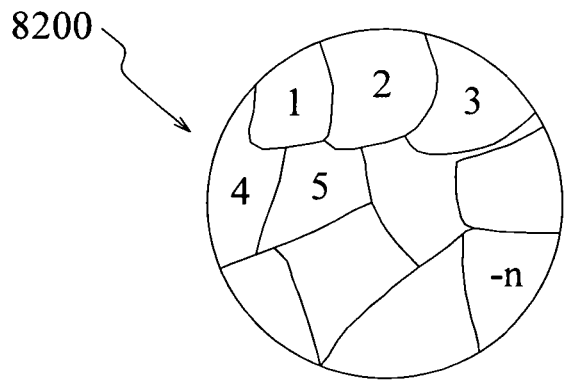
Figure 24:
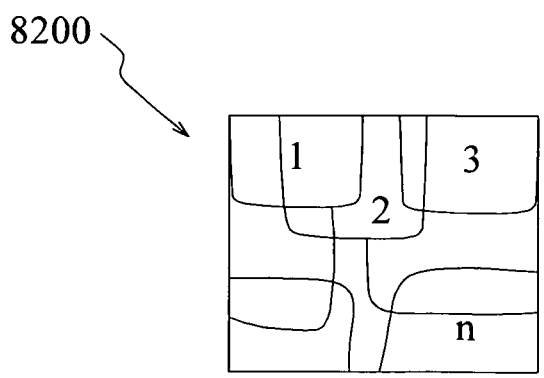

Turning now to FIGS. 22-24, in accordance with an exemplary embodiment of the claimed invention, there is illustrated the LED projector 8000 which is configured without the light pipe 1110 to lower the manufacturing cost of the LED projector 8000. The collection lens 7600 of the LED projector 8000 of FIG. 18 is replaced with a lenslet array 8200. The lenslet array 8200 can circular as in FIG. 7 or rectangular as in FIG. 8, and is made up of more than one lens or lenslet. The lenslets can be arranged in a regular array or can be random, or can be designed to a certain pattern for maximum efficiency and uniformity. Each lenslet images the LED onto a spot in plane A (as shown in FIG. 22). It is appreciated that this spot in plane A is at the substantially same position as the output end or face 1300 of the light pipe 1100. Since this spot in plane A is composed of images formed by each lenslet, the total intensity profile can be made uniform. The output is then coupled to the projection screen (not shown) through the imaging panel 7300, the projection engine 7100, and the projection lens 7200. In accordance with an aspect of the claimed invention, the lenslet array 8200 can transform a square LED 1400 into a rectangular output matching to various projection aspect ratio formats. In general, the output pattern can be any size, shape, and intensity profile as needed.

Figure 25:
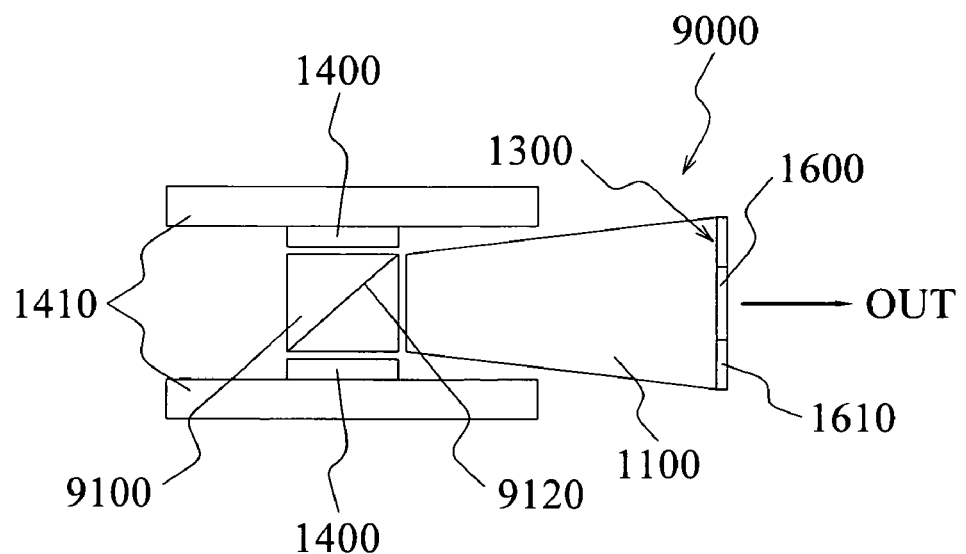
FIGS. 25-27 are cross-sectional view of the recycling system comprising a beam splitter/combining (BSC) system in accordance with an exemplary embodiment of the claimed invention.
Figure 25:
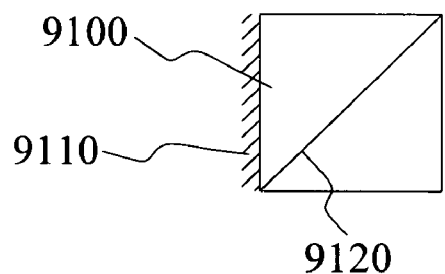
Figure 25:
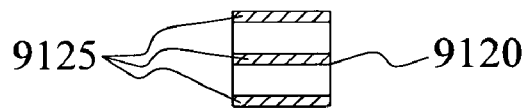

In accordance with an exemplary embodiment of the claimed invention, a recycling system 9000 comprising a beam splitter/combining (BSC) system 9100 in which all surfaces/faces reflectively polished to promote TIR and two LEDs 1400 is shown in FIG. 25. In accordance with an aspect of the claimed invention, the BSC 9100 comprises two triangular prisms (all faces/surfaces reflectively polished to promote TIR) put together with a partially reflective interface 9120. The partial reflective interface 9120 can be made with partial reflective coating or by using partially coated surface with reflective coating. It is appreciated that the reflectivity ratio can be controlled by the size of the coating surface area. For example, the partially reflective interface 9120 can comprise reflective stripes 9125 (shown) or reflective dots (not shown).

The outputs from the LEDs 1400 are coupled into the BSC 9100. A portion of the light from the LEDs 1400 is reflected to the output end 1300 of the light pipe 1100 as output, a portion of the light is directed to the other LED 1400, and the remaining portion of the light is directed towards the reflective surface of the BSC 9100. It is appreciated that the BSC 9100 acts as a waveguide because all six surfaces are polished, preferably reflectively polished to promote TIR. Generally, the light emitted from the LEDs 1400 that are not directed to the output end of the light pipe 1100 as output will be recycled and eventually exit the light pipe 100 as output. Depending on the specific application, the output from the BSC 9100 can be used as is or can be further coupled through an output the output light pipe (not shown), which can be straight, tapered, hollow, or solid. The light pipe 1100 and the output light pipe (not shown) can be a regular light pipe or a recycling light pipe with a partially reflective output surface 1610, and can additionally comprise a reflective polarizer 1600 at the output end 1300 to provide polarized output for LCOS, LCD, or other polarization dependent systems.

Figure 26:
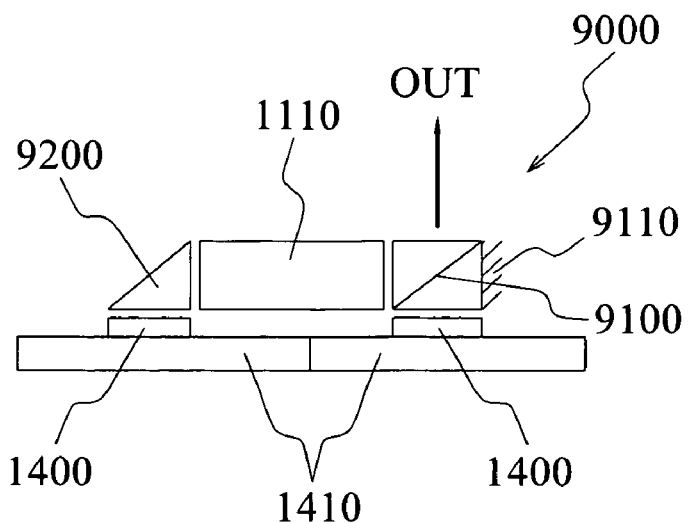
Figure 27:
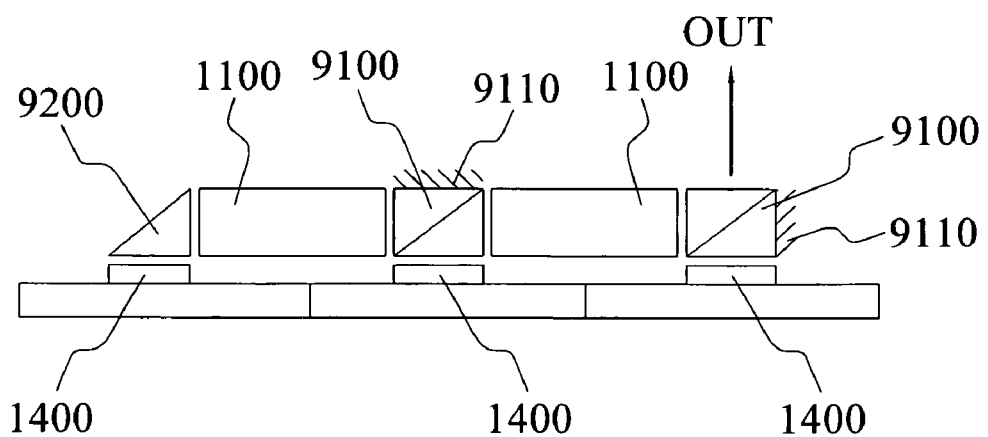

Although the recycling system 9000 comprises a single waveguide system comprising the BSC 9100, two LEDs 1400 and light pipe 1100, the recycling system 9000 can be extended include a network of waveguides. In accordance with an exemplary embodiment of the claimed invention, FIG. 26 shows a two-LED recycling system 9000 where the LEDs are placed on the same plane as the waveguides (the light pipe 1100, a triangular prism 9200 with all sides polished, preferably reflectively polished to promote TIR, and the BSC 9100 with a reflective surface 9110). FIG. 27 shows three-LED recycling system 9000 comprising three LEDs 1400, two light pipes 1100, two BSC 9100 with the reflective surface 9110, and one triangular prism 9200. It is appreciated that the recycling system 9000 is not limited to one, two or three LEDs, but a plurality of LEDs can be recycled together using a network of waveguides (light pipes 1100, triangular prisms 9200 and BSCs 9100).

Figure 28:
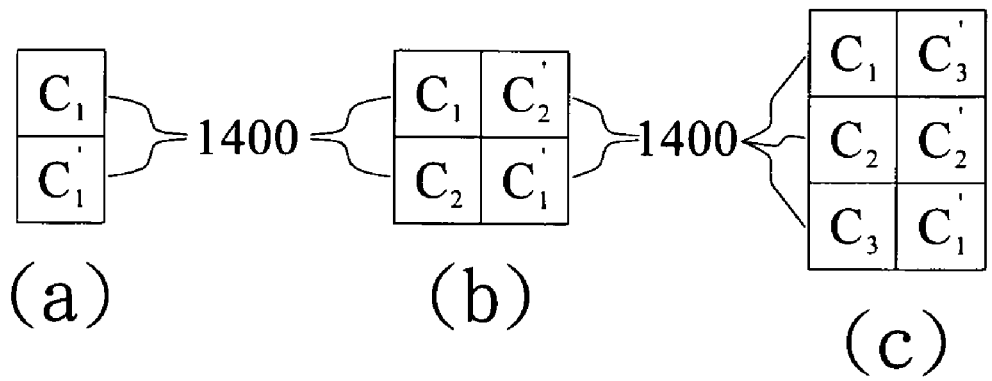
FIGS. 28(a)-(f) show various configurations of the LEDs or LED chips in accordance with an exemplary embodiment of the claimed invention.
Figure 28:
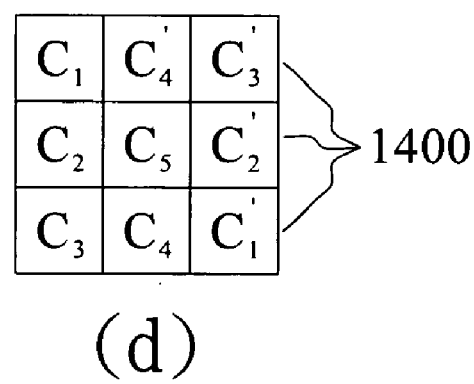
Figure 28:
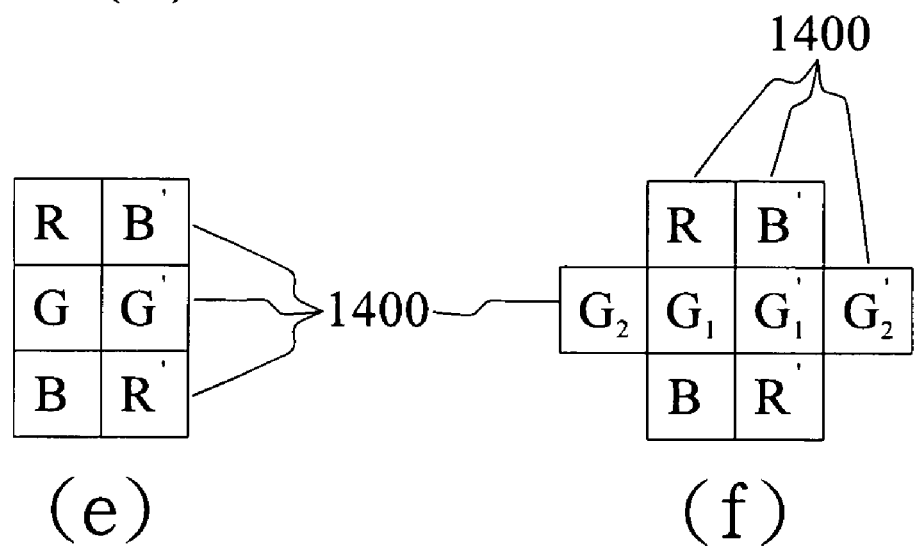

In accordance with an exemplary embodiment of the claimed invention, FIGS. 28(*a*)-(*f*) show various configuration of the LEDs or LED chips 1400. The LED or LED chip 1400 labeled "C" indicates that the LED chip 1400 is a colored chip which can be a white LED chip, red LED chip, green LED chip, blue LED chip, or any other color LED chip. Due to the imaging property of the recycling reflector 8100, each pair of LEDs is imaged onto each other for recycling, and preferably each pair of LEDs are of the same color. For example, in FIG. 28(*c*), imaging pair $C_1$ and $C'_1$ are of the same color, imaging pair $C_2$ and $C'_2$ are of the same color, etc.

FIG. 28(e) show red (R), green (G), blue (B) LED version of FIG. 28(c), wherein the imaging pairs of (R, R'), (B, B'), and (G, G'). FIGS. 28(d) and 28(f) show other combinations of the LED chip arrangements. It is appreciated that other combinations and configurations of the LED chips are possible and contemplated in the claimed invention. It is noted that a specific LED chip arrangement would depend on the application of the claimed recycling system.

Figure 29:
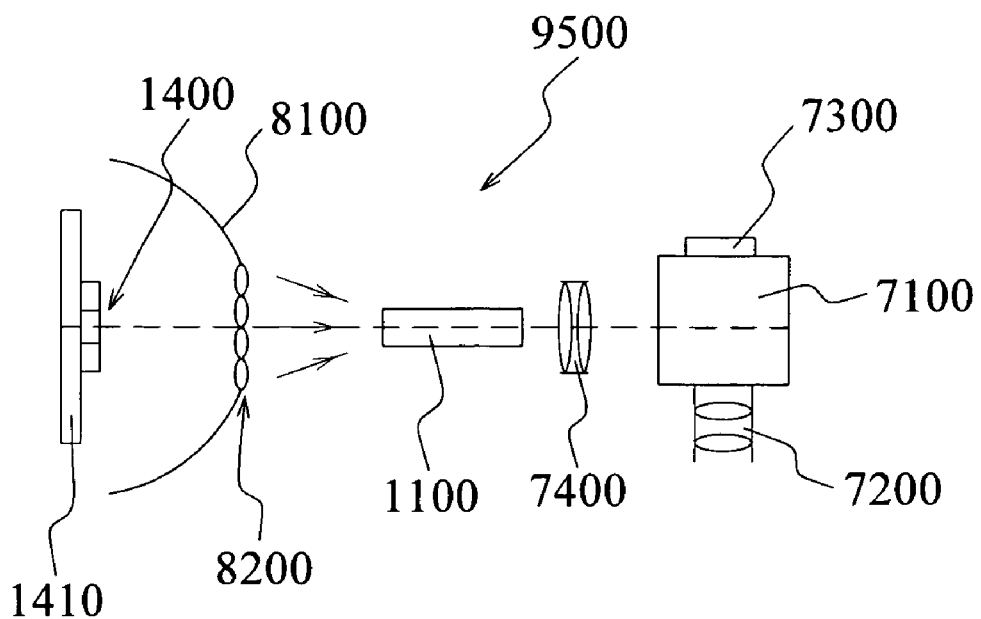
FIG. 29 is cross-sectional view of the RGB sequential projector in accordance with an exemplary embodiment of the claimed invention.

Turning now to FIG. 29, there is illustrated an RGB sequential projection system or RGB sequential projector 9500 in accordance with an exemplary embodiment of the claimed invention. The RGB sequential projector 9500 comprises the projection engine 7100, the imaging panel 7300, projections lens 7200, relay lens 7400, light pipe 1100, recycling reflector 8100, RGB LEDs 1400, and lenslet array 8200. The RGB sequential projector 9500 can multiplex three colors in time to produce color images onto the screen (not shown) using an imaging panel 7300 for pixel intensity control. The outputs of the RGB LEDs 1400 are recycled by the recycling reflector 8100 and coupled using the lens, lenslet array and/or lens array 8200 described herein. It is appreciated that since the RGB LEDs 1400 can be time multiplexed, color wheel 7500 is not needed and not shown in FIG. 29.

Figure 30:
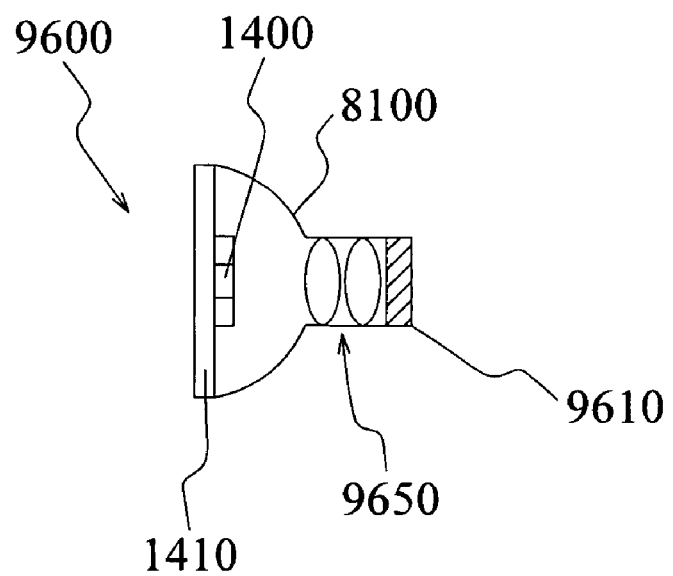
FIG. 30 is cross-sectional view of a light source in accordance with an exemplary embodiment of the claimed invention.

In accordance with an exemplary embodiment of the claimed invention, as shown in FIG. 30, the light source 9600 comprises LEDs 1400 mounted on the heatsink substrate 1410, the recycling reflector 8100, and optional lens system 9650 which can be used for general lighting or incorporated into various projectors described herein. The LEDs 1400 can be a single color, or multiple color LEDs 1400. The lens system 9650 can be configured such that the light output can have a predetermined angle of divergence. In accordance with an aspect of the claimed invention, the lens system 9650 can be configured such that the light output can be focused into a target, such as the light pipe 1100 of a projector 9500.

In accordance with an exemplary embodiment of the claimed invention, the light source 9600 can comprise an optional diffuser 9610, which can be inserted before or after the lens system 9650, thereby permitting further adjustment of the light output profile. The diffuser 9610 can be a ground glass, a holographic diffuser, or a lens array. In accordance with an exemplary embodiment of the claimed invention, the recycling reflector 8100, the lens system 9650, and the optional diffuser 9610 can be molded in plastic or glass as a single unit for ease of assembly and lower manufacturing cost.

In accordance with an exemplary embodiment of the claimed invention, the lens system 9650 can be configured to be collimating such that the light source 9600 can replace a standard lamp with parabolic reflectors. In accordance with an aspect of the claimed invention, the lens system 9650 can be configured to be converging such that the light source 9600 can replace a standard lamp with elliptical reflector. In accordance with an aspect of the claimed invention, the lens system 9650 can be configured to be diverging such that the light source 9600 can replace a standard lamp for general spot light applications. It is appreciated that the lens system 9650 can additionally comprise an optional diffuser 9610, thereby permitting further adjustment of the light output profile for optimum results.

The invention, having been described, it will be apparent to those skilled in the art that the same may be varied in many ways without departing from the spirit and scope of the invention. Any and all such modifications are intended to be included within the scope of the following claims.

The invention claimed is:

1. An apparatus for recycling light to increase the brightness of the light output, comprising: a recycling light pipe comprising an input end and an output end; wherein the input end of said recycling light pipe comprises an input aperture for receiving an input light from a light source and a reflective input surface; wherein the output end of said recycling light pipe comprises an output aperture for outputting light from said recycling light pipe and a reflective output surface for reflecting a portion of light directed towards the output end to the input end of said recycling light pipe; and wherein the input aperture transmits a part of the portion of the light reflected by the reflective output surface to the light source to be recycled and the reflective input surface reflects a remaining part of the portion of the light to the output end of the recycling light pipe, thereby increasing the brightness of the light exiting the output aperture through recycling of the light, further comprising at least two light sources, at least two recycling light pipes and a 6-sided beam combiner for combining outputs of said at least two recycling light pipes to provide a single beam of output; and wherein each six sides of said beam combiner is polished to promote total internal reflection such that said beam combiner functions as a waveguide.

2. Apparatus of claim 1, wherein said beam combiner comprises a diagonal surface coated to provide a partial reflective surface.

3. Apparatus of claim 2, wherein said diagonal surface of said beam combiner comprises spatially reflective portions to provide said partial reflective surface.

4. Apparatus of claim 1, further comprising an air gap or low index glue between each recycling light pipe and said beam combiner.

5. Apparatus of claim 1, wherein said beam combiner comprises a reflective polarizer to provide a single beam of polarized output.

6. Apparatus of claim 1, further comprising at least two light sources, a light source being coupled to the input aperture of each recycling light pipe; and wherein each light source is a dual paraboloid reflector (DPR) lamp coupled to an input end of a light pipe; and wherein an output end of the light pipe of each light source being coupled to the input aperture of the recycling light pipe.

7. Apparatus of claim 6, wherein said beam combiner comprises a reflective output surface for reflecting light and an output aperture for outputting light.

8. An apparatus for recycling light to increase the brightness of the light output, comprising: a recycling lightpipe comprising an input end and an output end; wherein the input end of said recycling light pipe comprises an input aperture for receiving an input light from a light source and a reflective input surface; wherein the output end of said recycling light pipe comprises an output aperture for outputting light from said recycling light pipe and a reflective output surface for reflecting a portion of light directed towards the output end to the input end of said recycling light pipe; and wherein the input aperture transmits a part of the portion of the light reflected by the reflective output surface to the light source to be recycled and the reflective input surface reflects a remaining part of the portion of the light to the output end of the recycling light pipe, thereby increasing the brightness of the light exiting the output aperture through recycling of the light, further comprising a reflective polarizer at the output end of said recycling light pipe; and wherein said recycling light pipe comprises first and second tapered light pipes with common surface filled with index matching glue, epoxy or fluid; wherein the input light entering the first tapered light pipe is coupled into the second tapered light pipe; and wherein said reflective polarizer reflects unused polarization of light back to the light source for recycling, thereby increasing the brightness of the light output.

9. Apparatus of claim 8, wherein the light source is a dual paraboloid reflector (DPR) lamp; and wherein said reflective polarizer reflects unused polarization of light back to the DPR lamp for recycling, thereby increasing the brightness of the light output.

10. Apparatus of claim 9, further comprising at least two light sources and a reflective polarizer at the output end of each recycling light pipe; and wherein each recycling light pipe comprises first and second tapered light pipes with common surface filled with index matching glue, epoxy or fluid; wherein the input light entering the first tapered light pipe is coupled into the second tapered light pipe; and wherein said reflective polarizer of each recycling light pipe reflects unused polarization of light back to a corresponding light source for recycling, thereby increasing the brightness of the light output.

11. A LED projector having apparatus for recycling light to increase the brightness of the light output, said apparatus comprising: a recycling light pipe comprising an input end and an output end; wherein the input end of said recycling light pipe comprises an input aperture for receiving an input light from a light source and a reflective input surface; wherein the output end of said recycling light pipe comprises an output aperture for outputting light from said recycling light pipe and a reflective output surface for reflecting a portion of light directed towards the output end to the input end of said recycling light pipe; and wherein the input aperture transmits a part of the portion of the light reflected by the reflective output surface to the light source to be recycled and the reflective input surface reflects a remaining part of the portion of the light to the output end of the recycling light pipe, thereby increasing the brightness of the light exiting the output aperture through recycling of the light, wherein the light source is a white LED coupled to input aperture of said recycling light pipe; and wherein said LED projector further comprises a projection engine, an imaging panel, a projection lens, a relay lens, and a color wheel; and wherein the output of the recycling light pipe is coupled into the projection engine through the relay lens, the imaging panel and the color wheel to provide a sequential color images for projection by the projections lens.

12. The LED projector of claim 11, wherein the imaging panel is a digital mirror device (DMD) or liquid crystal on silicon (LCOS) panel.

13. The LED projector of claim 11, further comprising a recycling reflector for recycling light by reflecting a portion of light emitted by the LED back into the LED; and wherein the recycling reflector comprising output aperture for outputting light.

14. The LED projector of claim 13, wherein the LED comprises a plurality of single color LEDs or multi-colored LEDs; and wherein the recycling reflector images one LED onto another LED, thereby increasing the recycling efficiency.

15. The LED projector of claim 13, further comprising a collection lens for focusing light exiting the output aperture of the recycling device into said recycling light pipe.

16. The LED projector of claim 13, wherein the recycling reflector is a solid optical component having an output surface; and wherein a portion of the output surface of the recycling reflector is coated with reflective coating to provide a reflective surface and a remaining portion of the output surface of the recycling reflector is transmissive to provide the output aperture.

17. A LED projector having an apparatus for recycling light to increase the brightness of the light output, said apparatus comprising: a recycling light pipe comprising an input end and an output end; wherein the input end of said recycling light pipe comprises an input aperture for receiving an input light from a light source and a reflective input surface; wherein the output end of said recycling light pipe comprises an output aperture for outputting light from said recycling light pipe and a reflective output surface for reflecting a portion of light directed towards the output end to the input end of said recycling light pipe; and wherein the input aperture transmits a part of the portion of the light reflected by the reflective output surface to the light source to be recycled and the reflective input surface reflects a remaining part of the portion of the light to the output end of the recycling light pipe, thereby increasing the brightness of the light exiting the output aperture through recycling of the light, wherein the light source is RGB LEDs; and wherein said LED projector further comprises a projection engine, an imaging panel, a projection lens, a relay lens, an lenslet array, and a recycling reflector for recycling light by reflecting a portion of light emitted by the RGB LEDs back into the RGB LEDs; and wherein the recycling reflector comprises an output aperture for outputting light which is coupled to said lenslet array; and wherein the output of the recycling light pipe is coupled into the projection engine through the relay lens, the imaging panel and said lenslet array to multiplex three colors of light in time to provide color images for projection by the projection lens.

18. An apparatus for recycling light to increase the brightness of the light output, comprising: a recycling light pipe comprising an input end and an output end; wherein the input end of said recycling light pipe comprises an input aperture for receiving an input light from a light source and a reflective input surface; wherein the output end of said recycling light pipe comprises an output aperture for outputting light from said recycling light pipe and a reflective output surface for reflecting a portion of light directed towards the output end to the input end of said recycling light pipe; and wherein the input aperture transmits a part of the portion of the light reflected by the reflective output surface to the light source to be recycled and the reflective input surface reflects a remaining part of the portion of the light to the output end of the recycling light pipe, thereby increasing the brightness of the light exiting the output aperture through recycling of the light, further comprising: at least two light sources, each light source being a LED; and a 6-sided beam/light combiner with all sides reflectively polished to provide reflective surfaces and to promote total internal reflection (TIR) such that said BSC system functions as a waveguide; and wherein said BSC system reflects a first portion of light from each LED to the output end of said recycling light pipe as output, reflects a second portion of the light from each LED to other LED for recycling, and a remaining portion of the light from each LED is directed towards reflective surfaces of said BSC system.

19. Apparatus of claim 18, wherein said beam/light combiner comprises a partially reflective diagonal interface.

20. Apparatus of claim 18, further comprising a reflective polarizer at the output end of said recycling light pipe to provide a polarized light output.

21. Apparatus of claim 18, further comprising a plurality of 6-sided beam/light combiners, a plurality of LEDs, and a triangular prism with all sides reflectively polished to promote TIR.

22. A LED projector, comprising a LED for providing input light, a projection engine, a projection lens, an imaging panel, a lenslet array, a color wheel, a recycling reflector for outputting a portion of the input light to said lenslet array and reflecting a remaining portion of the input light back to the LED for recycling; and wherein the lenslet array couples different color light in time to the projection engine through the color wheel, the relay lens and imaging panel to provide sequential color images for projection by the projection lens.

23. The LED projector of claim 22, wherein said lenslet array is arranged in a circular or rectangular array.

* * * * *